US008965672B2

(12) United States Patent
Sawhill et al.

(10) Patent No.: US 8,965,672 B2
(45) Date of Patent: Feb. 24, 2015

(54) SYSTEM AND METHOD FOR PLANNING, DISRUPTION MANAGEMENT, AND OPTIMIZATION OF NETWORKED, SCHEDULED OR ON-DEMAND AIR TRANSPORT FLEET TRAJECTORY OPERATIONS

(71) Applicants: Bruce K. Sawhill, Santa Cruz, CA (US); James W. Herriot, Palo Alto, CA (US); Bruce J. Holmes, Williamsburg, VA (US)

(72) Inventors: Bruce K. Sawhill, Santa Cruz, CA (US); James W. Herriot, Palo Alto, CA (US); Bruce J. Holmes, Williamsburg, VA (US)

(73) Assignee: NextGen AeroSciences, LLC, Williamsburg, VA (US)

( * ) Notice: Subject to any disclaimer, the term of this patent is extended or adjusted under 35 U.S.C. 154(b) by 0 days.

(21) Appl. No.: 14/038,920

(22) Filed: Sep. 27, 2013

(65) Prior Publication Data

US 2014/0163850 A1 Jun. 12, 2014

Related U.S. Application Data

(63) Continuation of application No. 13/358,310, filed on Jan. 25, 2012, now Pat. No. 8,554,458.

(60) Provisional application No. 61/435,999, filed on Jan. 25, 2011, provisional application No. 61/450,453, filed on Mar. 8, 2011.

(51) Int. Cl.
*G06F 19/00* (2011.01)
*G08G 5/00* (2006.01)
*G08G 5/04* (2006.01)

(52) U.S. Cl.
CPC ............ *G08G 5/0039* (2013.01); *G08G 5/0013* (2013.01); *G08G 5/0052* (2013.01); *G08G 5/0082* (2013.01); *G08G 5/045* (2013.01); *G08G 5/0043* (2013.01)
USPC .......................................................... 701/120

(58) Field of Classification Search
USPC .......................................................... 701/120
See application file for complete search history.

(56) References Cited

U.S. PATENT DOCUMENTS

| | | | |
|---|---|---|---|
| 6,334,344 | B1 | 1/2002 | Bonhoure et al. |
| 7,702,427 | B1 | 4/2010 | Sridhar et al. |
| 2004/0078136 | A1 | 4/2004 | Cornell et al. |
| 2009/0125221 | A1 | 5/2009 | Estkowski et al. |
| 2010/0114633 | A1 | 5/2010 | Sislak et al. |
| 2010/0156698 | A1 | 6/2010 | Baud et al. |
| 2010/0318295 | A1 | 12/2010 | Flotte et al. |

FOREIGN PATENT DOCUMENTS

WO 0048129 A1 8/2000

OTHER PUBLICATIONS

Callantine, T.J., "Modeling off-nominal recovery in NextGen terminal-area operations," American Institute of Aeronautics and Astronautics, San Jose State University/NASA Ames Research Center, Moffett Field, CA (2011).

Notification of Transmittal of the International Search Report and the Written Opinion of the International Searching Authority, or the Declaration, International Application No. PCT/US2012/022566, filed on Jan. 25, 2012.

*Primary Examiner* — Mary Cheung
*Assistant Examiner* — Anne Mazzara
(74) *Attorney, Agent, or Firm* — Burns & Levinson LLP; Bruce D. Jobse, Esq.

(57) ABSTRACT

Disclosed are algorithms and agent-based structures for a system and technique for analyzing and managing the airspace. The technique includes managing bulk properties of large numbers of heterogeneous multidimensional aircraft trajectories in an airspace, for the purpose of maintaining or increasing system safety, and to identify possible phase transition structures to predict when an airspace will approach the limits of its capacity. The paths of the multidimensional aircraft trajectories are continuously recalculated in the presence of changing conditions (traffic, exclusionary airspace, weather, for example) while optimizing performance measures and performing trajectory conflict detection and resolution. Such trajectories are represented as extended objects endowed with pseudo-potential, maintaining objectives for time, acceleration limits, and fuel-efficient paths by bending just enough to accommodate separation.

12 Claims, 20 Drawing Sheets

SYSTEM AND METHOD FOR PLANNING, DISRUPTION MANAGEMENT, AND OPTIMIZATION OF NETWORKED, SCHEDULED OR ON-DEMAND AIR TRANSPORT FLEET TRAJECTORY OPERATIONS

RELATED APPLICATIONS

This application claims priority to the following U.S. patent applications, the subject matters of which are incorporated herein by this reference for all purposes, including the following:

U.S. Provisional Patent Application Ser. No. 61/435,999, filed on Jan. 25, 2011, entitled Airspace Phase Transitions And The Traffic Physics Of Interacting 4DTrajectones; and U.S. Provisional Patent Application Ser. No. 61/450,453, filed on Mar. 18, 2011, entitled Airspace Phase Transitions And The Traffic Physics Of Interacting 4DTrajectories.

In addition, the subject matter of the following commonly owned U.S. patent applications, filed on even date herewith, is incorporated herein by this reference for all purposes:

U.S. patent application Ser. No. 13/358,246, now U.S. Pat. No. 8,594,917, entitled Method And Apparatus For Dynamic Aircraft Trajectory Management.

FIELD OF THE DISCLOSURE

The disclosure relates traffic control and monitoring, and, more specifically, to systems and techniques for control and monitoring air traffic within an airspace.

BACKGROUND OF THE DISCLOSURE

The science of traffic physics is a new field emerging at the boundary of agent-based modeling and statistical physics. It addresses the statistical properties of large numbers of self-propelled objects acting on their own behalf. To date, the science has largely been applied to roadway vehicle dynamics because of the significant societal and financial import and because the problem is simplified by geometrical constraints. In addition, road traffic systems offer ready access to large amounts of data. This research has applicability to other many-agent systems in addition to roadways. The utility of the science is the ability to define systemic measures that are independent of the particular behaviors of each agent in a traffic system and independent of details of the system itself (such as geometric characteristics), much as the pressure exerted by a gas on its container is independent of the details of motion of each individual molecule in the gas and independent of the shape of the container.

Physical systems consisting of many particles are often characterized in terms of phase, such as liquid, solid, or gaseous. The phase is a property of an entire system, rather than of any of its particular components. Systems of interacting agents in freeway traffic have been shown both theoretically and empirically to exhibit phases that correspond to free-flowing ("liquid") or jammed ("solid") traffic. Traffic also has phases that do not have analogues in common physical systems, such as backwards-flowing waves of stalled traffic mixed with moving traffic.

If a system has more than one phase, it will have boundaries between phases. Varying a control parameter (such as temperature moving water from ice to liquid) can generate a phase transition. In purely physical systems, control parameters are usually external, though in engineered or biological systems they can be internal and adaptive. The set of phenomena around phase transitions are called critical phenomena, and include the divergence of the correlation length, ergodicity breaking (not all possible states of the system reachable from a given configuration), and other phenomena. The divergence of the correlation length is of particular interest in traffic systems because it means that a perturbation in one part of a system can affect another part at a large distance, with implications for controlling methodologies.

Just as molecules obey certain laws (conservation of energy and momentum and the equipartition of energy), the traffic "molecules" (agents representing vehicles with drivers) obey simple laws implemented in a fully distributed fashion—attempting to get where they are going as quickly as possible (with an upper limit) and interacting with other vehicles, such as avoiding collisions and following at a safe distance. Even though systems of self-propelled entities do not obey the same conservation laws as traditional equilibrium statistical systems do, many of the traffic physics systems that have been recently proposed have mappings onto well-studied equilibrium systems.

An example of this is the highly simplified collective motion model of Vicsek et. al., (T. Vicsek, A. Czirok, E. Ben Jacob, I. Cohen, and O. Schochet, "Novel type of phase transitions in a system of self-driven particles", Physical Review Letters, Vol. 75 (1995), pp. 1226-1229) inspired by the computer graphics work of Reynolds (C. Reynolds, "Flocks, birds, and schools: a distributed behavioral model", Computer Graphics, Vol. 21 (1987). pp. 25-34). Their model consists of a collection of entities all traveling at the same invariant speed in two dimensions but whose headings are allowed to vary. At each update cycle of the model, the directions of the particles are updated by the following rule: The direction is updated by taking the average of the directions of the neighboring particles in a radius r and adding a noise term. $v_i(t+1)=(v(t))_r+\theta_i$. The end result is a textbook phase transition as depicted in FIG. 1 which illustrates the relationship between Phase Transitions and Noise, where the y-axis denotes average alignment of particles, the x-axis denotes noise.

At low noise values ($\eta$), the entire system tends to align. As noise increases, uncorrelated motion results. As the system size becomes larger (the multiple curves shown) the curves asymptote to a single curve, another classic indicator of phase transition behavior. If one approaches the phase boundary from the high-noise side (large values of $\eta$) then there is a sudden emergence of preferred direction in the model; this is the phase transition boundary. As the system size approaches infinity, the onset of preferred direction becomes infinitely sharp.

A somewhat more realistic model than the previous one has been developed by Helbing (D. Helbing, "Traffic and related self-driven many-particle systems", Reviews of Modern Physics, Vol. 73, 2001, pp. 1067-1141; D. Helbing, et al., "Micro- and macro-simulation of freeway traffic", Mathematical and Computer Modeling, Vol 35, 2002, pp. 517-47) and others and corroborated with simulation and empirical data. In vehicle traffic, throughput (or capacity) of a roadway increases with density to a certain point after which a marked decrease is observed; hence, the emergence of a traffic jam. In this model the driving parameter is vehicle density per length of roadway, not noise. The two models and their effects are related: The higher the density the greater the frequency of correcting behavior (speeding up, slowing down). Each incidence of correcting behavior is associated with uncertainty (noise). Instead of the noise being applied externally, it is endogenously generated by adaptive agent behavior. When density is low, overshoots and undershoots do not propagate very far because of the "slack" in the system.

At a certain critical point, these perturbations ricochet throughout the system, generating a cascade of corrections and pushing the system into a radically different configuration (the "traffic jam" phase). The noise generated with each speed correction creates an equal or greater number of other speed corrections and the system cannot stably return to the initial configuration. This generates a phase transition. FIG. 2 illustrates a plot of a freeway traffic phase diagram in which the dotted line represents theoretical prediction for pure truck traffic, the solid line represents pure automobile traffic, and the black crosses indicate simulation results for mixed traffic, and the grey boxes indicate actual freeway measurements.

In prior art, systems and methods for separating aircraft has been limited to the use of radar, radio, conflict-probe and other software, and air traffic controller instructions to aircraft. The limitation of the past method is that it does not allow for management of trajectories based on the probabilities of future conditions in the airspace. Extending the traffic physics paradigm to the airspace problem requires some modifications and extensions to the current models in the literature. For the most part, aircraft have intent, and this factor needs to be reflected in any realistic model of the airspace. The Helbing model discussed above effectively incorporates intent, as the particles are constrained to move in one dimension, with intent to reach another location. The Vicsek model, though it has similarities to flight models, does not incorporate intent because there is no preferred direction of motion. Due to iterated directional corrections and the influence of noise, the initial direction of a particle may change by a large amount over time, and there is no notion of the initial (or any a priori) direction being "preferred" or "optimal", though the model spontaneously generates preferred direction under the right parameter settings.

Accordingly, a need exists for an air traffic control system and technique that incorporates intent in a natural and computationally efficient way.

A further need exists for a system and technique to predict phase behaviors in an airspace.

Another need exists for the ability to develop a traffic physics/phase transition description and algorithmic measures to predict when an airspace will approach the limits of its capacity.

Still a further need exists for a system and technique to control an airspace phase state through management of bulk properties of many trajectories simultaneously.

Yet another need exists for the ability to identify effective approaches for separation assurance for aircraft trajectories (as contrasted with separation for aircraft only) in an airspace.

A still further need exists for algorithms, agent-based structures and methods for analyzing and managing the complexity of airspace states, while maintaining or increasing safety, involving large numbers of heterogeneous aircraft trajectories.

Additionally, a need exists for continuous replanning of flight paths so as to continually adjust all future flight paths to take into account current and forecast externalities as knowledge of these forecasts become available.

Finally, the need exists for this continuous replanning to be accomplished at computing speeds many times faster than real time, so as to complete the replanning in sufficient time to implement air traffic control adjustments in advance of the predicted unwanted phase behaviors.

SUMMARY OF THE INVENTION

The system and technique disclosed herein utilize fully dynamical aircraft trajectories, and managing of the airspace in terms of its bulk properties. In the system and techniques disclosed herein, entire regions of airspace are characterized as solvable (or not)—within the limits of available computational resources—while accounting for the physical constraints of aircraft using the airspace, as well as short-lived constraints such as weather and airport closures. System and technique disclosed herein utilizes many "agents" representing aircraft trajectories that optimize their individual fitness functions in parallel. In addition, trajectory replanning comprises part of the dynamic trajectory management process. In this system and technique, the continual replanning of trajectories incorporates objective functions for the separation and maneuvering of the aircraft, the Air Navigation Service Provider (ANSP) business case considerations, as well as a pseudo-potential "charged string" concept for trajectory separation coupled with trajectory elasticity, together provide for the optimal management of airspace. The algorithms support monitoring of the collective dynamics of large numbers of heterogeneous aircraft (thousands to tens of thousands) in a national airspace undergoing continuous multidimensional and multi-objective trajectory replanning in the presence of obstructions and uncertainty, while optimizing performance measures and the conflicting trajectories.

Disclosed herein is a system and technique for utilizing a Dynamical Path (DP) as a way to accurately represent dynamical trajectories computationally. Such a system may be implemented with a Desktop Airspace software platform in which simulation of entire real and imagined airspaces enables research, planning, etc. With computational modeling, highly scalable, high performance simulations may be created with scales to 10000s of trajectories, so an entire airspace can be modeled computationally. The system is designed to be fast, so the models can run substantially faster than real time. With a computational model, trajectories are modeled like wiggling strands of spaghetti staying away from each other and from storms. Following are brief descriptions of the basic elements of the disclosed trajectory management model.

Central to the focus of the computational modeling of trajectories is the concept of is continuously replanning the trajectories in the face of disruption. Dynamical Paths live in the context of many other DPs, also continuously replanning their trajectories. The disclosed system enables managing of a suite of trajectories to operate safely and efficaciously. Such approach not only applies to computation modeling and simulations but may be extended to and applied to actual flight in the airspace.

In systems with many elements, disruptions are endemic; hence, continuous replanning is required. Such approach is a departure from the "static" mind-set, which attempts to plan once and for all, seeking accurate trajectory predictions far into the future. Such a legacy static paradigm encounters and deals with disruption episodically, but not systematically. In contrast, the dynamical paradigm disclosed herein assumes continuous disruption, dealing with disruption systematically and continuously. Even the best plan is only best in the context of other plans—hence, what is "best" can change dynamically and such change can ripple through the system, forcing others to re-plan as well.

Computationally, Continuous Replanning has a time granularity of Delta T. The Delta T value is set according to the agility required to react in a timely way to disruptions. The Delta T is mediated by available computational resources, communications latencies, and other factors affecting the lead times required to take management actions to implement flight path changes derived from the system and technique.

The Delta T need not be a constant over time—replanning time frequency may change. However, our algorithms prefer that replanning be synchronous across all Dynamical Paths.

A Dynamical Path is made up of continually changing Paths via the Continuous Replanning process. In the contemplated computational model, a Path lives in four dimensions (x, y, z+time space)—similar in this way to a "string" in String Theory in physics. Time on a Path is unrelated to the "actual" simulated Present Time (see below) of the aircraft. By definition, the points in the actual past on a Path are the same as the points actually flown. The points in the actual future of the aircraft are open to be planned per system/aircraft objectives.

Path Node or Node is a 4D "string" object made up of Path Nodes in 4D geometric space. A Path Node has 7 scalar values: x, y, z location; x, y, z velocities; and time. The Path Nodes are ordered in time—the times in the Path Nodes of a Path ascend monotonically. A set of Path Nodes uniquely defines a Path (one of many Paths which make up a single DP). Path Nodes are used as Control Points (CP) for changing or modifying Paths. Changing the values of a single Path Node effectively changes the Path. Hence, Path Nodes function as Control Points for altering a Path. Paths are made up of Path Nodes and the interpolated points between Path Nodes. Interpolated points between Path Nodes are computed using cubic splines. Hence Paths are continuous mathematical functions, as are the velocities. Accelerations are not necessarily continuous using this approach. However, Path Nodes are carefully chosen to correspond to flyable trajectories. A Path can be "re-sampled" at other points in time, resulting in an almost identical Path.

A Dynamical Path is a 5-dimensional entity with x, y, z, and two kinds of time. The two kinds of time are Path Time and Present Time. Path Time is the time along Path, even though the Path will probably never be entirely flown. Path Time is mostly hypothetical since it's only flown for sure to the next Delta T. Present Time is the time of where the aircraft actually is. Paths are continuously replanned at each point in Present Time.

As discussed above, each Path is a 4D entity, with an associated time dimension, but, each DP is composed of a series of Paths generated at each Delta T by Continuous Replanning. At each delta T, the best Path is (re-)calculated from that point in time into the future. That Path is flown as planned to (only as far as) the next Delta T replanning point. When the aircraft arrives at the next replanning point, a new best Path is recalculated. Although a Path encodes a plan into the far future, it is only used for one Delta T segment. It's important to plan an entire Path including into the far future, even if not entirely flown. This because the best next Delta T segment to fly is informed by future plans. Even if the current Path plan is not flown, it's still the best plan as far as is known. It's also possible that conditions are stable, so recalculating a Path will result in same Path.

Once flown, the retroactive Path is fixed and immutable (for obvious reasons). At any point in (simulator's) Present Time, only the future is mutable and plan-able, not the past. But a Path spans the entire trajectory, so a Path includes path and future relative to Present Time. By definition, the points in the past on a Path are the same as the points actually flown. The Path is calculated and recalculated to continually determine the best Path to fly based on what is known "now." At the end of a flight, the Path is all in the past, and by definition, is the same as the trajectory. So, as the aircraft moves through Present Time, history grows in size, and the future shrinks.

A Fleet is a set of all aircraft in the simulation. Note that a Dynamical Path is unremarkable in isolation, and a good proxy for real Trajectories in the context of flight planning. Space is the domain of possible values of some entity. Path Space is the set of possible flight Paths for a single aircraft. Fleet Path is a set consisting of one Path for each aircraft. Fleet Path Space is the set of all possible flight Paths for the Fleet at a particular moment in the simulation. Fleet Path History is the Path history for every aircraft in the fleet, i.e., the content of the simulation. Path Space History is the set of possible flight Paths for a single aircraft as its possibilities become more constrained.

Paths must avoid each other as well as other objects like storms. Weather Cells are Storms and move over time in both predictable and unpredictable ways and must be avoided. In our computational model, one or more Weather Cells are introduced and moved within the Air Space. Paths must be dynamically replanned so as to continue to avoid storms (and each other) as storms move. Without this unpredictable element, Paths could otherwise be pre-planned once and for all at departure.

The computation is performed (organized) by software Agents. Conceptually, each Dynamical Path is endowed with "agency." Agents are semi-autonomous software code objects acting on their own behalf. The unit of computation is the Dynamical Path, not the aircraft. It is the responsibility of each Agent to calculate a new Path plan at each DeltaT. Agents do their calculations based on available information. Agents do not negotiate per se, but do take into account information about other Paths. Agents use Cost Functions to evaluate Path options. Cost Functions quantify issues like separation, fuel consumption, and punctuality. Optimization is achieved by minimizing overall "costs" associated with a Path. Information Technology issues are not addressed per se by this Dynamical Path system. There are pros and cons with where to locate computational resources. Computing on board the aircraft reduces latency for replanning, etc., but can increase weight, cost, and other operational considerations. Centralizing computing on the ground, or distributing computing to the aircraft has its own set of tradeoffs. How and where to distribute computing is an ongoing research topic, but not addressed herein.

Disclosed are a number of novel proprietary algorithms for calculating Dynamical Paths. In principle every Path must be Separated from every other path. Proximity separation detection is a central consumer of computing resources. In an overly simplistic approach, every Path would be checked for Separation with every other Path. This naïve approach scales in computational difficulty as the number of Paths squared. The calculation rapidly becomes impractical: 10000s of Paths would generate 100,000,000s checks for separation. An alternative approach is needed; one that scales to very large numbers of Paths.

The disclosed system and technique employs an alternative approach, called Spoxels, or direct analytics. In this approach, candidate Paths for separation are winnowed by location. Once the few candidates are determined, the closest Path approach is calculated. Closest approach of Cubic Splines can be calculated analytically. This Analytic Separation approach also scales well to very large numbers of Paths.

In principle, every Path must be separated from every other Path. Once a conflict is detected, the Paths at issue are modified to conform to Separation rules. In the near future, Separation rules must be adhered to without exception. In the far future, Separation can be more lax—actual Trajectories are still uncertain. In accordance with the disclosed system, a number of algorithms ensure proper Separation discipline. Note that in actual flight, the disclosed system and technique may be complemented with other algorithms.

Separation and a number of other factors influence the Trajectories of aircraft. Paths must be constructed (planned and replanned) to optimize many competing goals and constraints. These goals can be expressed in terms of monetized Cost Functions. Hard constraints like Separation are abstracted as very steep Cost Functions. Soft constraints like on-time arrival and goals like conserving fuel are monetized. The goal is to compute Paths that lie on the Pareto frontier of cost functions. Deciding relative trade-offs among goals functions are artifacts of policy. Computational modeling is used to explore trade-offs and advise policy. The following are some of the issues that must be optimized. Broadly speaking, fuel consumption, on-time arrival, and total operating costs, are economic issues.

Paths must be constructed which are flyable and comfortable. This means limiting climb and decent rates, turning radii, etc., within guidelines involving passenger comfort and aircraft limitations. Values are drawn from actual aircraft performance and policy data derived from discussions with air carrier pilots. These guidelines can be expressed as limits in the allowable accelerations of Paths. Intuitively, this can be visualized as limits on the "bend" in Paths, which is accomplished by choosing Path Nodes which conform to these Path limitations. Path is optimized in consideration and in context of rigid Separation limits, as discussed above.

The process of continuous replanning involves, searching for the best Path among possible Paths. The disclosed system uses a number of proprietary Search Algorithms. Paths are modeled as if they have electrostatic charge. Separation is maintained by Paths repelling each other. Paths are also repelled by Weather Cells (storms) or exclusionary airspace.

Paths are dynamically modified toward equilibrium of electrostatic charge forces. The disclosed system utilizes algorithms for performing this approach. These algorithms rely on a data structure, described herein and referred to as "Spoxels", to identify nearby Paths. As Paths are modified, Path Nodes are migrated to other Spoxels. Charge Repulsion is performed in the context of economic and other influences on Paths. As mentioned above, intuitively, Paths are dynamically wiggling 4D strands of spaghetti.

A population of Path Candidates is generated and evaluated. This technique is reminiscent of genetic algorithms (GAs), but computed in the continuous domain in the disclosed method. Many candidate Paths can be considered at once, simultaneously. This approach enables efficiently exploring the space of many possible Paths. The Graphical Processor Unit (GPU) technology (see below) is particularly efficient at maintaining a population of many Paths.

According to one aspect of the disclosure, a method for determining the capacity of airspace to safely handle multiple aircraft comprises: method for managing the flight performance parameters of a plurality of aircraft within an airspace comprises: A) upon entry of aircraft into an airspace, acquiring data describing a trajectory for each of the plurality of aircraft; B) periodically re-calculating each trajectory; C) identifying conflicts between pairs of trajectories or a trajectory and an obstacle within the airspace; and D) modifying at least one trajectory of the conflicting pair of trajectories or a trajectory in conflict with an obstacle within the airspace; wherein one of B) and D) are performed in accordance with at least one predetermined rule. In one embodiment, the at least one predetermined rule is selected from any of routing, altitude, speed, reduced fuel burn, reduced flight time, reduced emissions through shorter segments flown at optimum altitudes, seamless climb to cruise, optimal profile descents, customer-required destination time-of-arrival, minimized time-of-flight. In another embodiment, the at least one predetermined rule is selected from any of aircraft separation minimum and obstacle separation minimum.

According to another aspect of the disclosure, a method for managing aircraft within an airspace comprises: A) upon entry of an aircraft into an airspace, receiving from the aircraft and storing in a computer memory data describing a trajectory representing the aircraft; B) periodically re-calculating trajectory; C) identifying conflicts between the trajectory representing the aircraft and another trajectory representing one of another aircraft and an obstacle within the airspace; D) modifying the trajectory representing the aircraft; and E) communicating data representing a modified trajectory to the aircraft. In one embodiment, the data representing a modified trajectory comprises any of aircraft altitude, speed, power settings, heading, required time of arrival, and aircraft configuration.

According to another aspect of the disclosure, a system for simulation and management of aircraft trajectories within an airspace comprises: A) a network interface, operably connectable to one or more sources of data relevant to an airspace model; B) a computer memory coupled to the network interface; C) a processor coupled to the computer memory and the network interface; D) an airspace model stored in the computer memory, the airspace model initialized to a plurality of parameters which collectively define characteristics of the airspace; E) a plurality of trajectory data structures stored in computer memory, each trajectory data structure representing a trajectory to be flown by an aircraft within the defined airspace model; and F) a trajectory management server application executable on the processor and configured for: i) acquiring and storing in the computer memory data describing an aircraft trajectory; ii) periodically re-calculating each trajectory having a corresponding trajectory data structure stored in the computer memory; iii) identifying conflicts between a first trajectory representing an aircraft and a second trajectory representing another aircraft or an obstacle within the airspace model; and iv) modifying the first trajectory representing the aircraft; wherein the modification of the first trajectory is performed in accordance with at least one predetermined rule.

BRIEF DESCRIPTION THE DRAWINGS

The present disclosure will be more completely understood through the following description, which should be read in conjunction with the drawings in which.

Figure 17A:
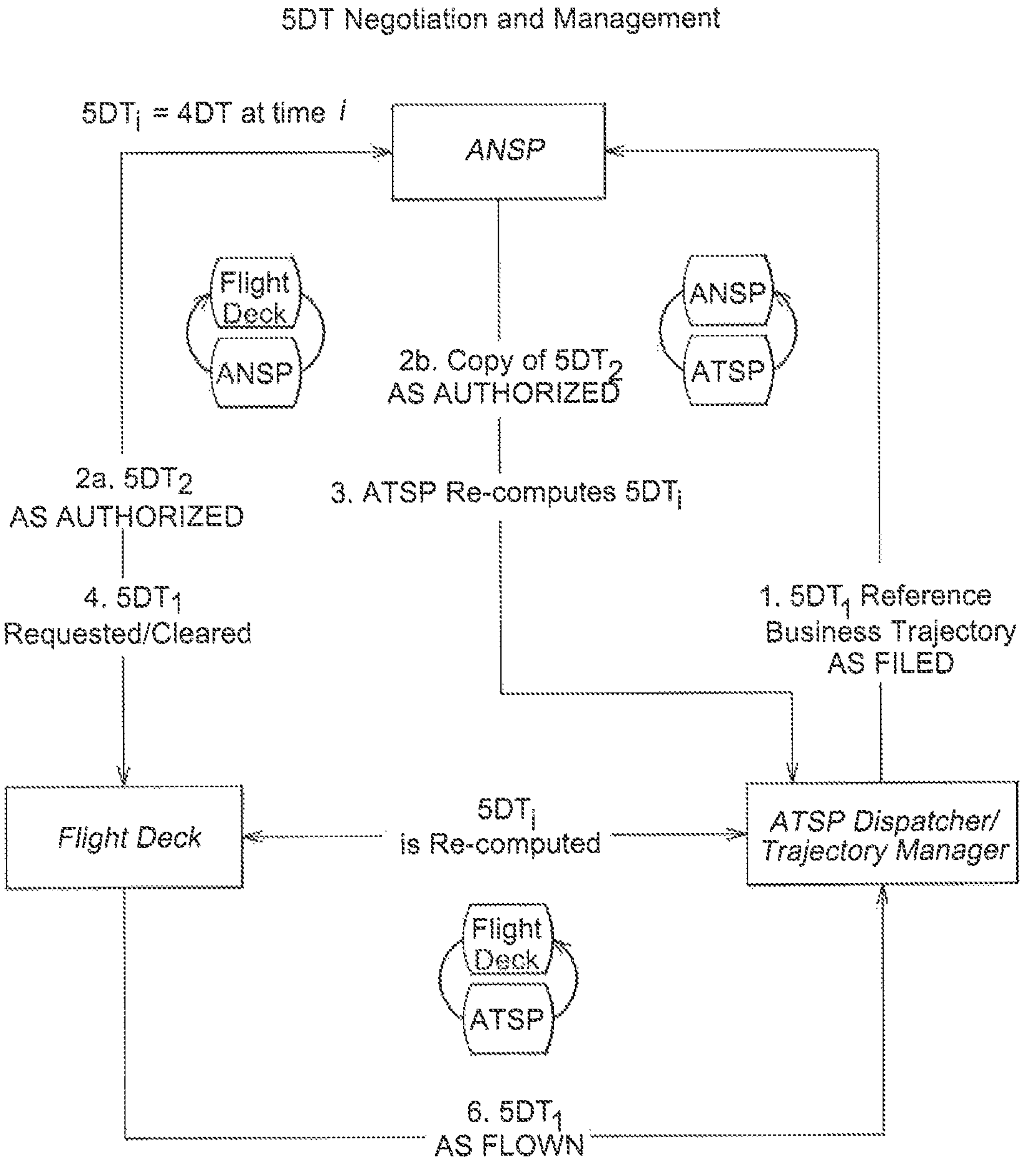
Figure 17B:
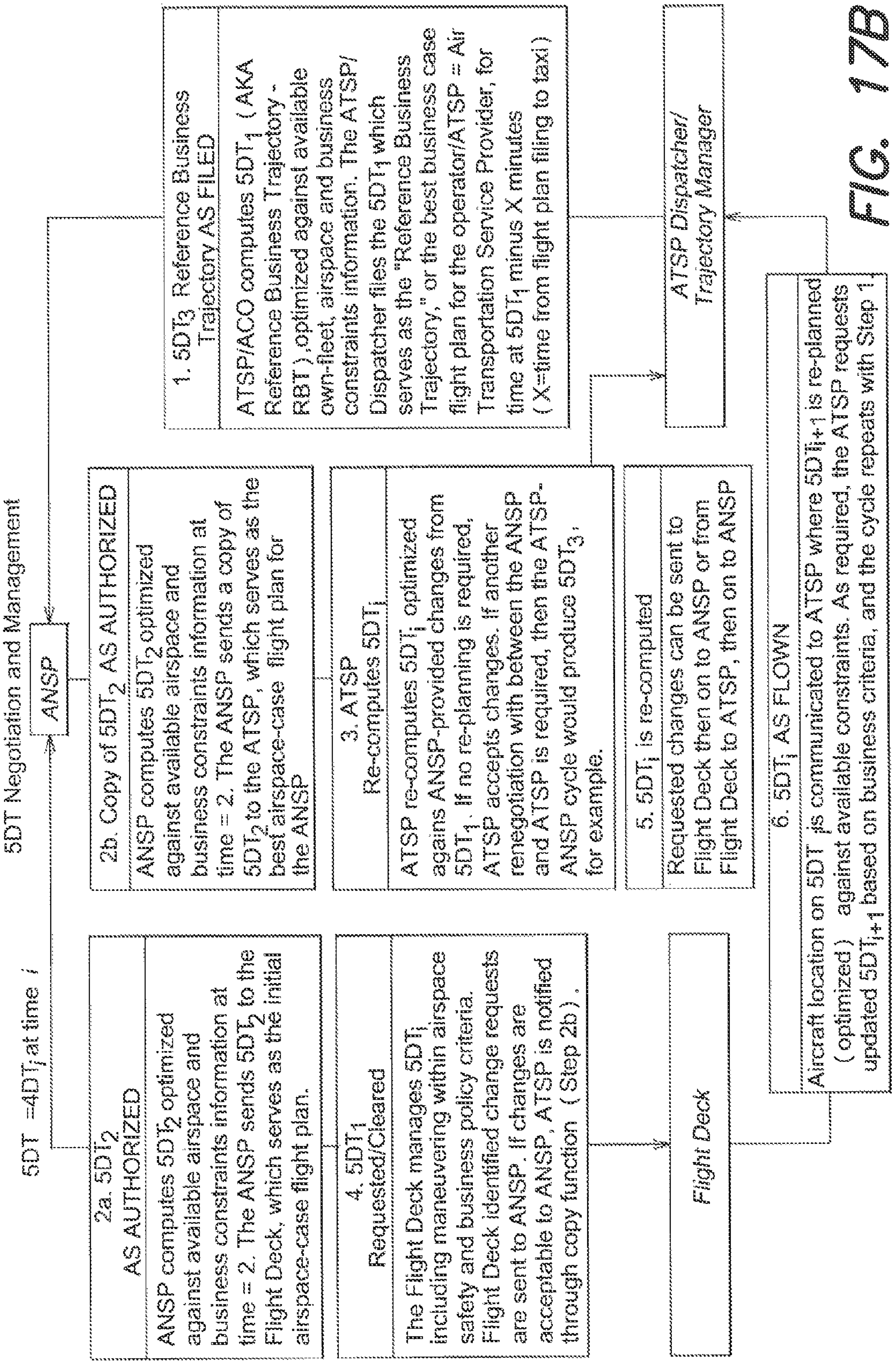
Figure 17C:
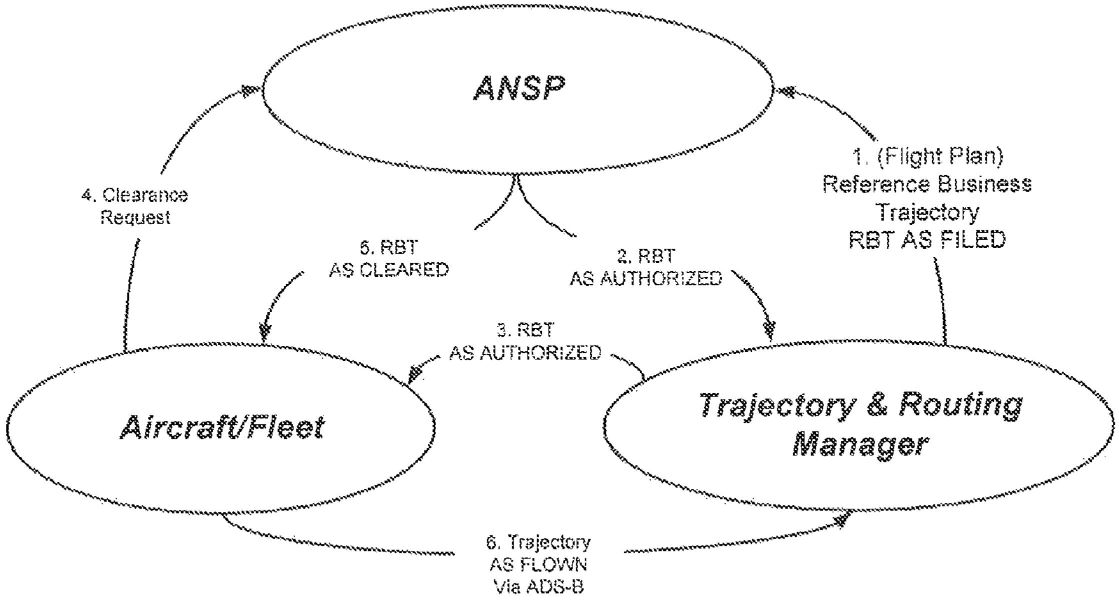

FIGS. 17A-C illustrate conceptually the negotiation and management of real aircraft trajectories in accordance the present disclosure; and FIGS. 18-21 are flow charts illustrating algorithmic process flows performed by the disclose system in accordance with the present disclosure;

DETAILED DESCRIPTION OF THE DISCLOSURE

List of Abbreviations and Acronyms

3SAT The Satisfiability Construct for all NP-hard problems
4DT Four Dimensional Trajectories
5DT Five Dimensional Trajectories
ABM Agent-Based Modeling
ANSP Air Navigation Service Provider
AOC Airline Operations Center
ATM Air Traffic Management
ATOP Advanced Technologies & Oceanic Procedures (FAA Ocean 21 Prog.)
ATSP Air Transportation Service Provider
CUDA Compute Unified Device Architecture
DARP Dynamic Airspace Reroute Program
DCIT Data Communications Implementation Team (FAA)
FANS Future Air Navigation System
FMC Flight Management Computer
JPDO Joint Planning and Development Office
NextGen Next Generation Air Transportation System
NAS National Airspace System
PBC Performance-Based Communication
PBN Performance-Based Navigation
PBS Performance-Based Surveillance
RBT Reference Business Trajectory
RNP Required Navigation Performance
RTP Required Time Performance
RVSM Reduced Vertical Separation Minimums
SAA Sense and Avoid
SESAR Single European Sky Advanced Research
TBO Trajectory-Based Operations (of airspace)
UAS Uncrewed Aerial Systems Disclosed is a system and technique in which individual aircraft flight path trajectories are assessed on the basis of the future condition probabilities, resulting in savings in energy, emissions, and noise, increases the number of fleet seats- or flights-per-day, and a reduction in empty seats- or flights-per-day. A method is disclosed for dynamic management of the performance of multiple aircraft flight trajectories in real-time. The computational approach to implementing the system and technique is sufficiently fast to work in faster than real-time, enabling predictive powers for managing airspace and fleets. The method applies to scheduled or on-demand air transport fleet operations, as well as to any operation of ground or air vehicle operations of individual or fleet makeup. Each aircraft flight trajectory is imbued with the mathematical equivalent of an electrically charged string. This charged string possesses a mathematical equivalent of an electrical charge at any point along the trajectory. Such charge is proportional to certain probabilities associated with the planned flight and plausible disruptions, as well as to the rules for air traffic conflict, detection, and resolution. These probabilities include measures associated with weather, traffic flows, wind field forecasts, and other factors. The charged string approach supports the speeds of computation required for real-time management of fleets and airspace, contributing within a computational and operational system for dynamically managing flight trajectories, to improved economic performance of aircraft fleets and airspace capacity. The resulting trajectory optimization calculations allow for frequent, real-time updating of trajectories (i.e., in seconds or minutes as appropriate to the need), to account for the impact of disruptions on each flight, based on the primary capital or operating cost function being optimized (corporate return on investment for example). The disruptions accounted for include, but are not limited to, weather, traffic, passengers, pilots, maintenance, airspace procedures, airports and air traffic management infrastructure and services. The system operates by integrating aircraft flight plan optimization capabilities, real-time aircraft tracking capabilities, airborne networking data communication capabilities, customer interface, and a fleet optimization system. The benefits in fleet performance exceed the benefits possible only using individual aircraft flight plan optimization systems and methods.

The disclosed system and technique incorporates intent of an aircraft in a natural and computationally efficient way by utilizing concepts involving charged strings, as described herein. More specifically, the disclosed system and technique accomplishes aircraft trajectory deconfliction by utilizing objects ("strings") carrying distributed "charge" to generate repulsive pseudo-forces that cause trajectories to de-conflict. These extended objects represent the trajectory of the aircraft, both the already flown portion and the part in the future that is available for modification. Since the aircraft is not treated as a point charge but rather as part of an extended path, moving the aircraft to resolve a conflict involves consistently moving the path that the aircraft is on. This is a better match to optimization procedures that use path-based measures (such as overall fuel consumption) to generate a fitness measure. The path is constrained in terms of its deformability by the physical characteristics and operating limitations of the aircraft, unlike point charge methods that can produce solutions that technically de-conflict, but do not necessarily generate flyable solutions.

In addition, this technique naturally extends to the inclusion of and accounting for uncertainty. Uncertainty in a 4D representation is an expanding "cone" of probability about the aircraft's location as a function of time. Charge can be distributed in higher dimensions than point or line distributions, and pseudo-potential methods offer a natural way of characterizing regions of space-time likely to have a large number of potential conflicts, even if the individual aircraft path options are very diffuse. The overlap of a large number of higher dimensional charge distributions will generate high potential just as the overlap of a large number of one dimensional (precise) charge distributions will. The difference is that knowing the paths exactly will generate an exact solution; not knowing the paths exactly will generate a description of a space that will require deconfliction in the future as information is resolved.

An aircraft 4D trajectory is an extended object in three spatial dimensions plus one time dimension, referred to as a string. In the absence of other impinging aircraft trajectories, a goal is to achieve an optimal solution for a single string, where optimal is defined as minimizing a cost function, often defined as, but not limited to, a weighted combination of total flight time and total flight costs (including fuel burn). Such technique is then extended to scenarios involving interacting trajectories combined with uncertainty in space and time, potentially for very large numbers of trajectories.

To achieve the dual aims of trajectory optimization while preserving separation assurance, (the requirement that planes do not fly too close to each other at any point in their flight path) an aircraft is computationally represented trajectory as an electrically charged string under tension. If all strings have the same sign of charge, they will repel each other. This electrostatic repulsion method addresses the issue of overall trajectory optimization which point repulsion methods do not, since the point methods do not contain any information about the intent of the aircraft involved (where they are going and what is the most efficient way to get there) and therefore cannot optimize to that constraint. The "fictitious forces" generated between the charged strings in the trajectory representation will repel the strings enough so as to ensure aircraft separation, but the counteracting string tension will ensure the minimum cost trajectory subject to this constraint.

Since there is always uncertainty associated with the part of an aircraft's trajectory that has not yet been flown, the future flight path can be represented as a four-dimensional hypercone with charge distributed over its volume rather than over the length of a string. The physics calculation is not fundamentally altered by changing the distribution of charge to be over a higher-dimensional object than a string. In addition to calculating fictitious repulsive forces, it is possible to calculate electrostatic potential fields. Electrostatic potentials measure the amount of energy required to move objects from a configuration of infinite separation to a configuration of proximity, and an electrostatic potential distributed over a region of space-time can serve as a computational measure for how full the airspace is (or will be) at a particular point in space and time, even accounting naturally for uncertainty. This is because many trajectories (even distributions of trajectory probabilities) impinging on a region of space-time will generate a region of high electrostatic potential. Utilizing this approach to phase-transition, it is possible to relate electrostatic potentials to measures of fullness of the airspace such as the number and frequency of controlling actions required to fulfill separation assurance, as explained with reference to the formal problem statement herein.

Formal Problem Statement

A simple example of a Boolean problem with applications to airspace science is the following: Consider two aircraft on a head-on collision course. Each aircraft has four "moves" available to it $M_i \in \{\text{Left, Right, Up, Down}\}$ where moves are defined in the ownship frame of reference. It is desirable to find systemic solutions for the two aircraft system $S_{12}$ of the form $S_{12} \in \{M_1, M_2\}$. Combinations of individual behaviors of the two aircraft that produce a systemically unsatisfied result are the following:

$$S_{unsat}=\{(\text{Up}_1 \wedge \text{Up}_2) \vee (\text{Down}_1 \wedge \text{Down}_2) \vee (\text{Right}_1 \wedge \text{Left}_2) \vee (\text{Left}_1 \wedge \text{Right}_2)\}.$$

The other 12 combinations of behaviors constitute satisfactory systemic behavior. This is an example of an under-constrained problem well to the left of a phase transition where many solutions are available to the system. Additional constraining elements might be the presence of more aircraft requiring more coordination or the reduction in available moves due to operational constraints.

In the interest of investigating general phase transition structure in airspaces, the disclosed system and technique utilizes a subset of the variables which characterize actual real-world airspaces and focuses on enroute trajectories, and simplified aircraft performance to specified limits on speeds and accelerations. In addition, the dynamical trajectories have been endowed with agency, acting in concert to automatically deform themselves according to separation and performance requirements.

The problem of continuous airspace replanning and deconfliction may be represented formulaically as follows:

Given the following definitions:

1. 5DT Trajectory Definition

A trajectory $T(\mathbb{X}(t,\tau); t,\tau)$, $\mathbb{X} \in \mathbb{R}^3$ is a continuous one-dimensional curve of finite length embedded in five-dimensional space-time characterized by three spatial dimensions and two time dimensions T: $(\mathbb{R}^3 \otimes \mathbb{T} \otimes \mathbb{T}) \rightarrow \mathbb{R}$. Position along a trajectory is parametrized by t and the current state of all trajectories (see Def. 2) is parametrized by $\tau$. Because of the extra time parameter associated with the current state of the system, these are known as "5DT" trajectories.

2. Airspace Definition

An airspace $\mathbb{A}$ is a set of $N(\tau)$ trajectories $\{T_i(\mathbb{X}(t,\tau); t, \tau), i=1, \ldots N(\tau), \mathbb{X} \in \mathbb{R}^3\}$ embedded in five-dimensional space-time $(\mathbb{R}^3 \otimes \mathbb{T} \otimes \mathbb{T})$ where t parameterizes position along each trajectory $T_i$ and $\tau$ is system ("global") time.

3. 5DT Time Relations Definitions $t, \tau$: $t<\tau$ is "past", $t=\tau$ is "present", $t>\tau$ is "future"

4. Aircraft Position Definition $t_i=\tau$ defines nominal position of aircraft i along trajectory $T_i(\mathbb{X}(t, \tau))$ 5. Finite-Range Pseudopotential between Trajectory Elements $dT_i$:

$$\phi(dT_1, dT_2, t, \tau) = \left\{ \begin{array}{cc} 0 \text{ if } D(dT_1, dT_2) > d_c \\ A(d_c - D(dT_1, dT_2))^a \text{ otherwise} \end{array} \right\},$$

Where D=distance between trajectory elements

Problem Statement:

Minimize total path length L of all trajectories for each $\tau$: $[\tau_i, \tau_f]$ $$\mathbb{L}_{min}(T) = \text{Min}\left\{\sum_{1}\int\left\|\frac{\partial T_i(\mathbb{x}(t,T))}{\partial t}\right\|dt\right\}$$

subject to the following constraints:

Constraints:

1. 4DT Fixed Endpoints of 5DT Trajectories (Endpoints and Flight Duration Fixed):

$$T_i(t=\tau_{init})=\{\mathbb{X},\tau\}_{init},\ T_i(t=\tau_{final})=\{\mathbb{X},\tau\}_{final},\ \mathbb{X}\in\mathbb{R}^3$$

2. Continuous Deconflicted Airspace State Requirement if $|T_i(z(t,\tau))-T_j(z(t,\tau))|<vsep$, $\|\vec{T}_i(x(t,\tau),y(t,\tau))-\vec{T}_j(x(t,\tau),y(t,\tau))\|>hsep$ for all $i\neq j$ and all $t,\tau$ such that $t_i=t_j$. z is the vertical coordinate of trajectory coordinate $T(\mathbb{x}(t,\tau))$, x and y are the horizontal coordinates of $T(\mathbb{x}(t,\tau))$. The airspace exists in a deconflicted state as well as a planned deconflicted state at all system times $\tau$. This separation specification is a statement of the normal "hockey puck" separation criterion.

3. Bounded Speed and Acceleration along $T_i$ $$v\text{min} < \left\|\frac{\partial T_i(\mathbb{x}(t,T))}{\partial t}\right\| < v\text{max for all } t, i$$

$$\left\|\frac{\partial^2 T_i(\mathbb{x}(t,T))}{\partial t^2}\right\| < a\text{max for all } t, i$$

4. Constants: {vsep, hsep, vmin, vmax, amax, A, $d_c$, $\alpha$} are all user specified constants Assumptions:

1. Planning: The Evolution of Trajectories:
   a. As global time $\tau$ increases, $N(\tau)$ changes as trajectories enter or leave the airspace system because of initiation or termination.
   b. As $\tau$ increases, the parts of trajectories characterized by $t<\tau$ become "past" and can no longer change.
   c. The parts of trajectories characterized by $t>\tau$ are "future" and are subject to continuous replanning until they become "past".
2. Acceleration Acceleration bounds are only considered along the trajectory, perpendicular forces are not considered explicitly.
3. Test Airspace
   a. The test airspace is a circular region of definable diameter.

Instantiation of Optimization Problem

1. Trajectories are approximated by a set of cubic splines $T_i$: $T_i \cong (S_{i,j}(\mathbb{x},\tau,t_j^{init},t_j^{final}), j=1,\ldots m)$ where each spline is defined over a time interval $[t_j^{init},t_j^{final}]$ such that the union of the time intervals describes the entire trajectory and the intersection of the splines is a set of control points.
   a. Positions and velocities are matched at each intersection of splines, accelerations are discontinuous at intersections and functions of form at+b otherwise.
   b. Positions and velocities are independent variables at each spline intersection point, accelerations are dependent variables.
2. Path integrals over the length of each trajectory are replaced by cost functions of the form $$C = \sum_{i=1}^{N}\sum_{j=1}^{m-1}|a(S_{i,j}) - a(S_{i,j+1})|$$

Where the a's are accelerations along the trajectory as defined in Constraints.
3. This minimizes a discrete form of the first derivative of acceleration, also known as "jerk". A cost function of this form is amenable to a local "smoothing" procedure that is simple and rapid to implement and is incorporated below in the conflict adapt procedure.

The pseudocode sample below is specific to the cubic spline instantiation of the trajectory deconfliction/optimization problem.

```
procedure trajectory optimization/deconfliction( )
begin
    initialize system time: T ← T_init
    initialize airspace 𝔸 with N(T_init) trajectories
    repeat
        initialize trajectory time t ← T
        repeat
            for all i, j: i > j
                if conflictdetect(T_i, T_j, τ) == False,
                    then next (i, j)
                else if conflictdetect(T_i, T_j, τ) == True
                    then conflictadapt(T_i, T_j, τ)
                    if conflictadapt(T_i, T_j, τ) == False
                        then
                            return adaptfailure( )
                            next (i,j)
                        else next (i,j)
                    end if
                end if
            end for
            increment trajectory time t ← t + Δt
        until (t == t_final)
        increment system time T ← T + ΔT
    until (T == τ_final)
end
procedure conflictdetect(T_i, T_j, τ)
begin
    initialize current state of trajectories T_i(t ≤ τ)
    compute time endpoint for trajectory pair t_max = Min(T_i^final, T_j^final)
    initialize t ← τ
    repeat
        if Distance(T_i(t), T_j(t)) ≤ d_c
            return {distance, t}
        end if
        increment planned trajectory time t ← t + Δt
    until (t == t_max)
end
procedure conflictadapt(T_i, T_j, τ)
begin
```

compute vector between desired and current closest spatial approach $\vec{\mathbb{S}}_j^D((t,\tau))$ compute vector between desired and current velocity: $\vec{\mathbb{V}}_j^D((t,\tau))$ initialize adjustmentcycle=0;

initialize adjust( )=FALSE while (adjustmentcycle≤max||adjust( )!=TRUE) do begin compute exponential damping factor $$f = \frac{e^{-adjustmentcycle}}{\sum_{1}^{max} e^{-adjustmentcycle}}$$

increment trajectory closest spatial approach by $f\vec{u}_j^D((t,\tau))$ increment velocity at closest approach by $f\vec{v}_j^D((t,\tau))$ adjust trajectory velocity and position with smoothing vector $\vec{s}(f\vec{u}_j^D((t,\tau)), f\vec{v}_j^D((t,\tau)))$

```
        if (        accelconstraintsatisfy == TRUE &&
                    velocityconstraintsatisfy == TRUE &&
                    separationdistancesatisfy ==TRUE)
        then adjust( ) = TRUE
    end
    if adjustmentcycle == max)
        return adaptfailure( )
end
```

System Platform and Network Environment

Figure 5A:
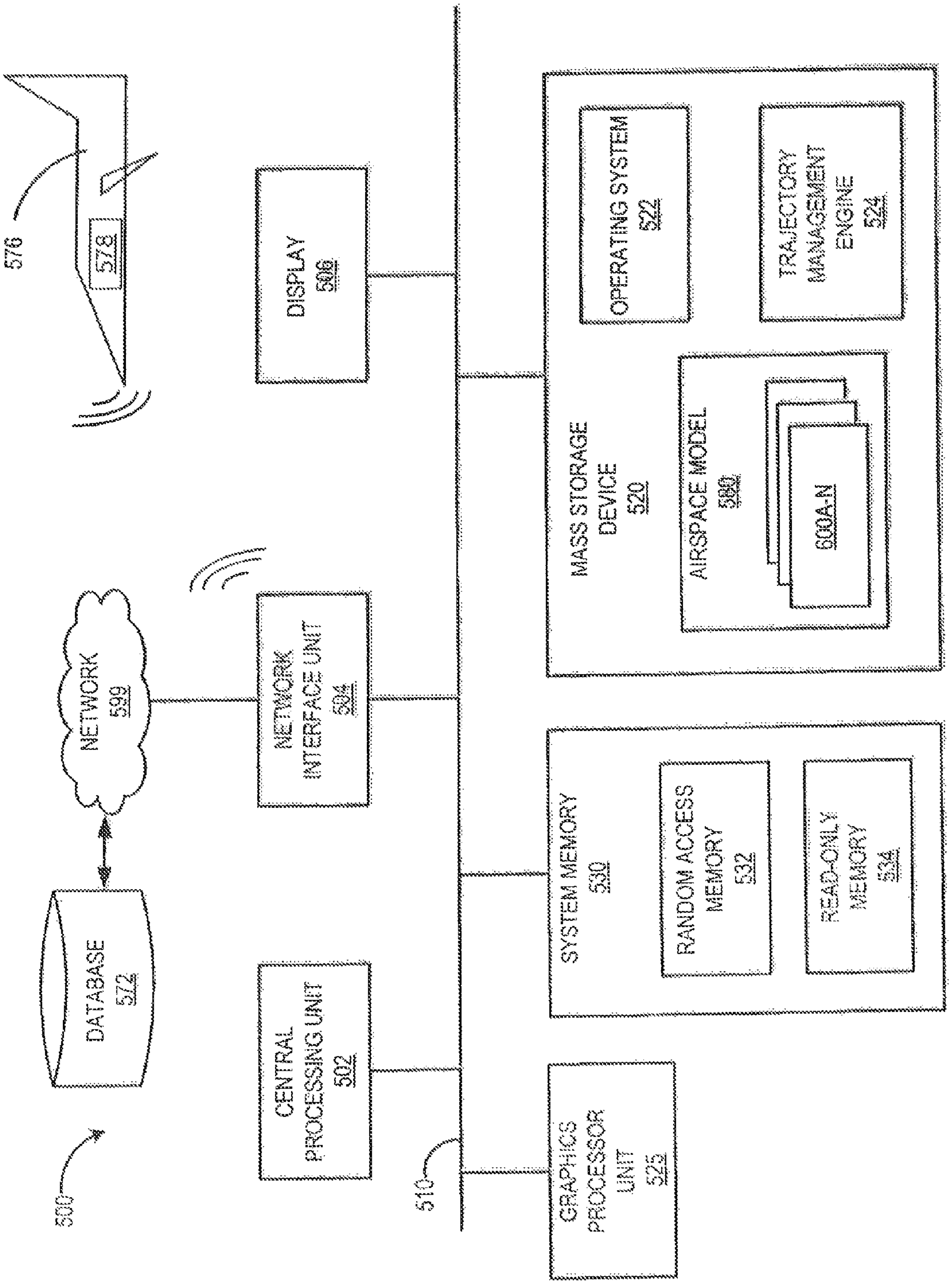
FIG. 5A illustrates conceptually a computer architecture for managing aircraft trajectories in accordance with embodiments of the present disclosure.

The computer architecture illustrated in FIG. 5A can include a central processing unit 502 (CPU), a system memory 530, including a random access memory 532 (RAM) and a read-only memory 534 (ROM), and a system bus 510 that can couple the system memory 530 to the CPU 502. An input/output system containing the basic routines that help to transfer information between elements within the computer architecture 500, such as during startup, can be stored in the ROM 534. The computer architecture 500 may further include a mass storage device 520 for storing an operating system 522, software, data, and various program modules, such as the trajectory management engine 524.

The mass storage device 520 can be connected to the CPU 502 through a mass storage controller (not illustrated) connected to the bus 510. The mass storage device 520 and its associated computer-readable media can provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 599. The computer architecture 500 may connect to the network 599 through a network interface unit 504 connected to the bus 510. It should be appreciated that the network interface unit 504 may also be utilized to connect to other types of networks and remote computer systems, such as a computer system on board an aircraft 576. The computer architecture 500 may also include an input/output controller for receiving and processing input from a number of other devices, including a keyboard, mouse, or electronic stylus (not Illustrated). Similarly, an input/output controller may provide output to a video display 506, a printer, or other type of output device. A graphics processor unit 525 may also be connected to the bus 510.

As mentioned briefly above, a number of program modules and data files may be stored in the mass storage device 520 and RAM 532 of the computer architecture 500, including an operating system 522 suitable for controlling the operation of a networked desktop, laptop, server computer, or other computing environment. The mass storage device 520, ROM 534, and RAM 532 may also store one or more program modules. In particular, the mass storage device 520, the ROM 534, and the RAM 532 may store the trajectory management engine 524 for execution by the CPU 502. The trajectory management engine 524 can include software components for implementing portions of the processes discussed in detail with respect to the Figures. The mass storage device 520, the ROM 534, and the RAM 532 may also store other types of program modules.

Software modules, such as the various modules within the trajectory management engine 524 may be associated with the system memory 530, the mass storage device 520, or otherwise. According to embodiments, the trajectory management engine 524 may be stored on the network 599 and executed by any computer within the network 599.

The software modules may include software instructions that, when loaded into the CPU 502 and executed, transform a general-purpose computing system into a special-purpose computing system customized to facilitate all, or part of, management of aircraft trajectories within an airspace techniques disclosed herein. As detailed throughout this description, the program modules may provide various tools or techniques by which the computer architecture 500 may participate within the overall systems or operating environments using the components, logic flows, and/or data structures discussed herein.

The CPU 502 may be constructed from any number of transistors or other circuit elements, which may individually or collectively assume any number of states. More specifically, the CPU 502 may operate as a state machine or finite-state machine. Such a machine may be transformed to a second machine, or specific machine by loading executable instructions contained within the program modules. These computer-executable instructions may transform the CPU 502 by specifying how the CPU 502 transitions between states, thereby transforming the transistors or other circuit elements constituting the CPU 502 from a first machine to a second machine, wherein the second machine may be specifically configured to manage trajectories of aircraft within an airspace. The states of either machine may also be transformed by receiving input from one or more user input devices associated with the input/output controller, the network interface unit 504, other peripherals, other interfaces, or one or more users or other actors. Either machine may also transform states, or various physical characteristics of various output devices such as printers, speakers, video displays, or otherwise.

Encoding of the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the system memory 530 when the software is encoded therein. For example, the software may transform the state of transistors, capacitors, or other discrete circuit elements constituting the system memory 530.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Although there are on the order of 2000 IFR aircraft in the NAS at typical peak periods, the systems and techniques disclosed herein are able to simulate several times as many aircraft (>10000) flying enroute trajectories simultaneously. Simulating large numbers of dynamically replanned aircraft trajectories in faster than real time requires considerable compute power. For ~100 aircraft, a conventional CPU (multi-core, one machine) computer hardware will suffice utilizing the algorithms disclosed herein. In order to simulate a complete airspace with $10^3$-$10^5$ aircraft GPU (Graphics Processor Unit) technology is appropriate. Modern GPUs have greater than 400 computing streams ("cores") running in parallel on each board. As such, in one illustrative embodiment, CPU 502 of computer architecture 500 may be implemented with a GPU 525, such as the Nvidia GTX470 GPU with 448 cores, commercially available from NVIDIA Corporation, Santa Clara, Calif. 95050, USA. Using a water-cooled case, three such GPUs may be implemented in one desktop computer, or about 1350 cores, achieving a performance of about 2 teraflops at a cost of about $2 per gigaflop. This is more than a thousand times cheaper than a decade ago and continues an exponential path that has remained unbroken for 50 years. Within another decade, it is conceivable that this amount of computing power could reside in an aircraft's cockpit. With a single GPU, the estimated gain is an approximate 100 times performance increase over conventional CPU single-core hardware architecture.

GPUs enable dramatically more computation for modeling assuming the disclosed algorithms are adapted to the parallel processing paradigm of the GPU, a task within the cup competency of one reasonably skilled in the arts, given the teachings, including the flowchart and pseudocode examples, contained herein. The GPU enables millions of software threads, up to 400 plus threads operating simultaneously. Fortunately, thousands of aircraft running simultaneous re-planning algorithms maps very well to the GPU parallel processing architecture. A bonus of using modern GPUs is advanced graphics, since GPUs were developed for video game applications. Accordingly, display 106 may be implemented with a high fidelity visual output device capable of simultaneously rendering numerous trajectories and their periodic updates in accordance with the system and techniques disclosed herein.

The software algorithms utilized by the system disclosed herein may be written in a number of languages including, C#, Python, Cuda, etc. For example, the trajectory management system 524, including any associated user interface therefore may be written in C sharp. High level control of the GPU, web interface, and other functions may be written in Python. Detailed control of the GPU may be written in Cuda and similar languages (Cuda is a C-like language provided by Nvidia for writing parallel processing algorithms). Such algorithms may execute under the control of the operating system environment running on generally available hardware including PCs, laptops, and GPUs. For example, as noted above, GPU 525, may be utilized alone, or in conjunction with parallel processing hardware to implement in excess of 1000 cores, enabling a multi-threaded software model with millions of threads of control. Hence, many threads can dedicated per aircraft Trajectory or Dynamical Path.

Figure 5B:
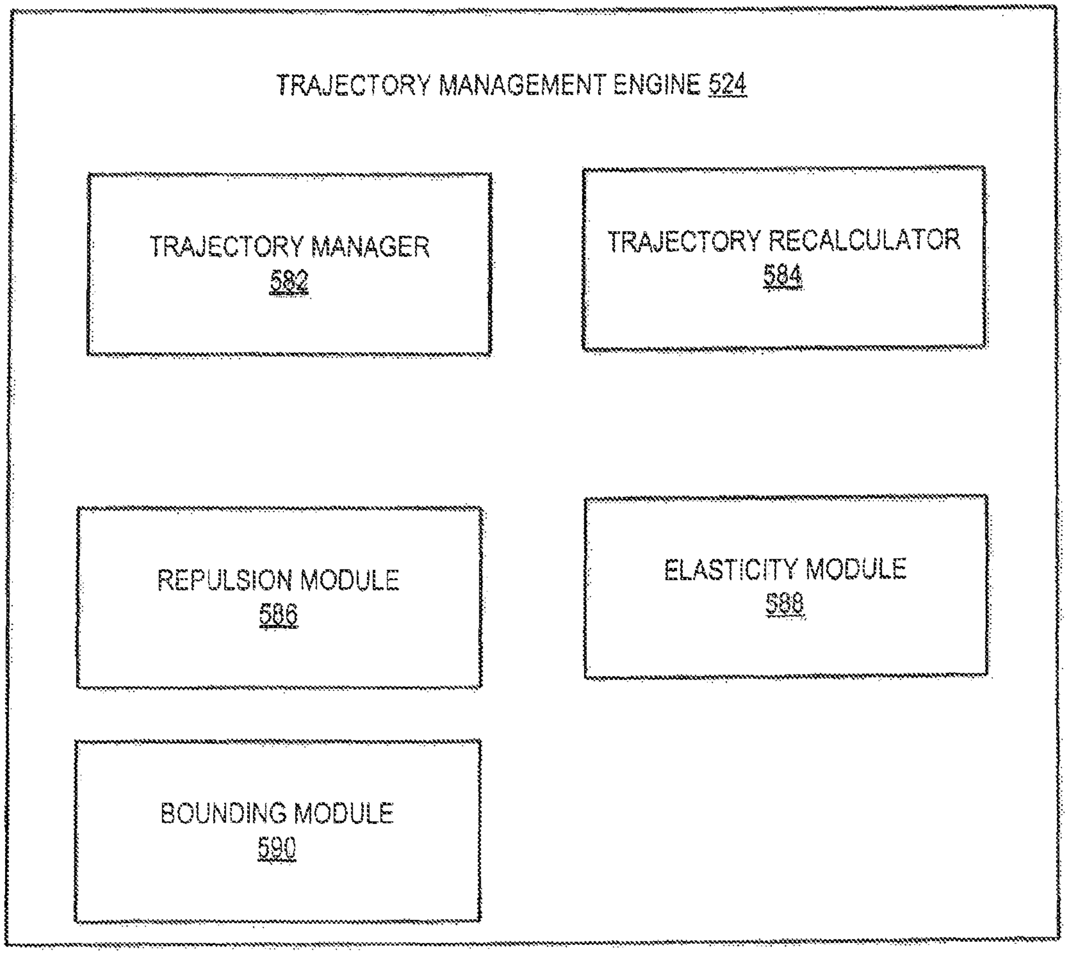
FIG. 5B illustrates conceptually a block diagram representing the architecture of a trajectory management engine for managing aircraft trajectories in accordance with embodiments of the present disclosure.

FIG. 5B illustrates conceptually a block diagram representing the architecture of a trajectory management engine for managing aircraft trajectories in accordance with embodiments of the present disclosure. In particular, the trajectory management engine 524 may include one or more executable program code modules, including but not limited to, a trajectory manager 582, a trajectory recalculator 584, a repulsion module 586, an elasticity module 588, and a bounding module 590. The functionality of the repulsion module 586, the elasticity module 588, and the bounding module 590 will become apparent in the descriptions associated with Figures and the pseudocode examples provided herein.

Figure 5C:
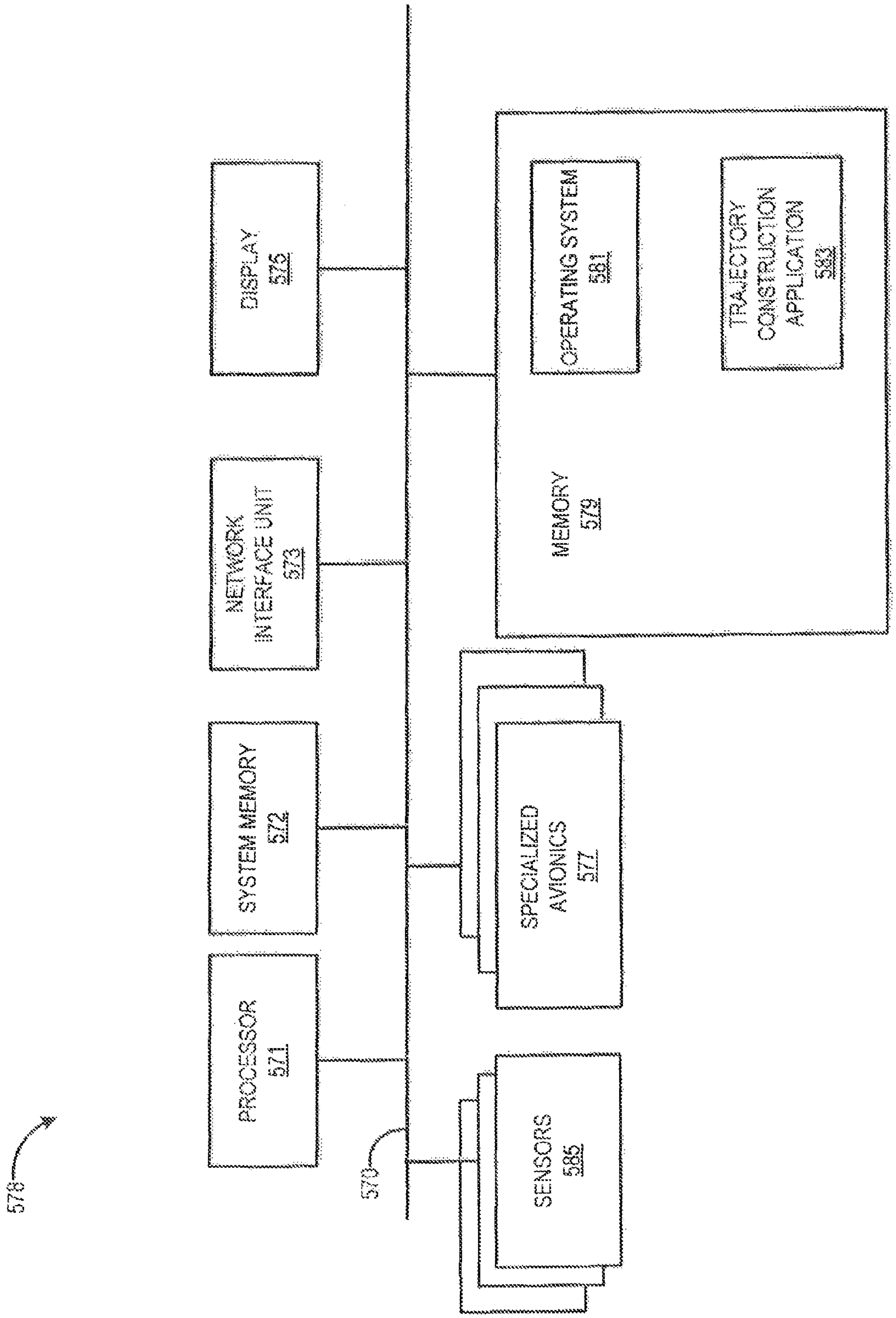
FIG. 5C illustrates conceptually a computer architecture on board an aircraft for planning aircraft trajectory in accordance with embodiments of the present disclosure.

FIG. 5C illustrates conceptually a computer architecture 578 on board an aircraft 576 for managing aircraft trajectories in accordance with embodiments of the present disclosure. The computer architecture 578 illustrated in FIG. 5C can include a processor 571, a system memory 572, a system bus 570 that can couple the system memory 572 to the processor 571. The computer architecture 578 may further include a memory 579 for storing an operating system 581, software, data, and various program modules, such as the trajectory construction application 583.

The memory 579 can be connected to the processor 571 through a mass storage controller (not illustrated) connected to the bus 570. The memory 579 and its associated computer-readable media can provide non-volatile storage for the computer architecture 578. Although the description of computer-readable media contained herein refers to a memory, such as a hard disk or CD-ROM drive, it should be appreciated by those skilled in the art that computer-readable media can be any available computer storage media that can be accessed by the computer architecture 578.

By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 578.

According to various embodiments, the computer architecture 578 may operate in a networked environment using logical connections to remote computers through a network. The computer architecture 578 may connect to the network through a network interface unit 573 connected to the bus 570. It should be appreciated that the network interface unit 573 may also be utilized to connect to other types of networks and remote computer systems, such as a computer system on board an aircraft 576. The computer architecture 578 may also include an input/output controller for receiving and processing input from a number of other devices, including a keyboard, mouse, or electronic stylus (not illustrated). Similarly, an input/output controller may provide output to a video display 575, a printer, or other type of output device.

The bus 570 is also connected to specialized avionics 577 that control aspects of the aircraft 576. In addition, the bus is connected to one or more sensors 585 that detect and determine various aircraft operating parameters, including but not limited to, aircraft speed, altitude, heading, as well as other engine parameters, such as temperature levels, fuel levels, and the like.

As mentioned briefly above, a number of program modules and data files may be stored in the memory 579 of the computer architecture 578, including an operating system 581 suitable for controlling the operation of a networked desktop, laptop, server computer, or other computing environment. The memory 579 may also store one or more program modules. In particular, the memory 579 may store the trajectory construction application 583 for execution by the processor 571. The trajectory construction application 583 can include software components for implementing portions of the processes discussed in detail herein. The memory 579 may also store other types of program modules. It should be appreciated that the trajectory construction application 583 may utilize data determined by one or more of the sensors 585 to assist in constructing the aircraft's trajectory.

Software modules, such as the various modules within the trajectory construction application 583 may be associated with the system memory 530, the memory 579, or otherwise. According to embodiments, the trajectory construction application 583 may be stored on the network and executed by any computer within the network.

The software modules may include software instructions that, when loaded into the processor 571 and executed, transform a general-purpose computing system into a special-purpose computing system customized to facilitate all, or part of, management of aircraft trajectories within an airspace techniques disclosed herein. As detailed throughout this description, the program modules may provide various tools or techniques by which the computer architecture 578 may participate within the overall systems or operating environments using the components, logic flows, and/or data structures discussed herein.

Airspace Model Characteristics

Figure 4:
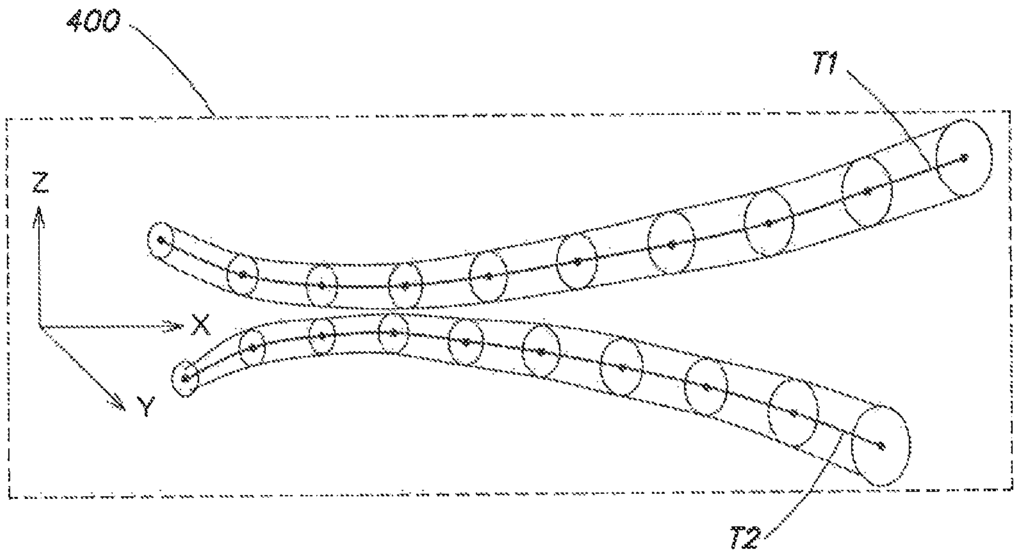
FIG. 4 illustrates conceptually a pair of trajectories in an airspace model in accordance with the present disclosure.

At the most elementary physical level, the airspace consists of air, aircraft and obstacles, e.g. weather cells, closed airspace, etc. In the enroute airspace aircraft trajectories may enter and exit at any peripheral points on the perimeter of the monitored airspace or from somewhere within the geographic area encompassed by the airspace, at their respective known cruise altitude and headings. Since the intent is to track large numbers of interactions between trajectories, the entry and exit points for each respective trajectory are initially positioned roughly based on the information known about the respective aircraft at the time of trajectory negotiation or entry into the airspace given its position entry an intended destination. The FIG. 4 shows a conceptual airspace model with trajectories of aircraft entering that have been deconflicted, i.e. deformed to enforce minimum separation.

The airspace provides the context for generating trajectories that are separated and flyable, if possible. An airspace region or model may be characterized as "successful" if all trajectories are separated and flyable. If any of the trajectories violate minimum separation distances, or are not flyable, the airspace may be characterized as a "failed" airspace. A flyable trajectory is defined as one where all the points along the trajectory lie within some specified range of speeds and accelerations of the aircraft. This is a proxy for the laws of physics, aircraft specifications, and airline policies.

Maintenance of a system of conflict-free trajectories may be managed by managing the bulk properties (airspeed, direction, altitude, for example) of the sets of dynamical trajectories in the airspace, so that a "safe" time/distance was maintained away from the phase boundary. Bulk property control in the system means the maintenance of conflict-free trajectories by keeping a "safe" distance between the current state of the system and a phase transition. "Safe" in this context means maintaining separation assurance, with conflict-free trajectories, throughout the test airspace. This safe time/distance may be graphed as computational iterations required to achieve a conflict-free phase state, for varying numbers of trajectories, for example. This time/distance to the phase boundary can also be Increase in computational intensity, measured in iterations to achieve conflict-free state. Alternative, the safe time/distance can be considered as the lead-time between present and future conflicted state, measured in minutes.

In addition to endowing the airspace with dynamical trajectories, the disclosed system and techniques address the large numbers of dynamical trajectories in the airspace and analyze all of the dynamical trajectories en masse—more like an airspace filled with dynamical trajectories, than individual aircraft. In deconflicting a congested airspace, it is not enough for a solution to exist. It must be discoverable in time to use it. Hence, the amount of computation required to find a solution can be as important as the existence of a solution. As discovered, nearing the phase transition of airspace capacity is not only a problem with loss of optionality but there is an increase in the expenditure of computing cycles near this phase transition. In test airspace, areas approaching a phase transition were characterized by reduced planning optionality and an increase in computing cycles expended in order to maintain minimum specified separation.

The functionality of continuous replanning built into the disclosed algorithms automatically addresses new separation issues as they arise, and dynamically re-calculated affected trajectories immediately. In this way storms are handled seamlessly (if they can be handled).

Airspace Density

The behavior of the airspace is a function of aircraft density, flight path geometries, mixes of aircraft types and performance, and separation minima. Density is defined by the number of aircraft introduced into the airspace and the size and shape (volume) of the airspace. As such, the rate of aircraft entering the airspace is dynamic. Density is also used herein as a parameter in the phase transition analysis metrics. However, since the airspace is non-uniform in its loci of trajectory interactions, a more sophisticated method of determining overall density, other than calculating the number of aircraft per unit of test airspace is needed. For the density computation, a Gaussian integral, applied to the distance from each aircraft to the measurement point, is used. This provided the probability density of finding an aircraft at the specified point if the aircraft positions are considered to have an uncertainty specified by a spread parameter. Alternatively, this approach measured the density of aircraft weighted more heavily near the measurement point, which provided a smooth, well-behaved density measure without discontinuities. Density units may be measured, for example, in aircraft per 10,000 km.

The presence of phase transitions and the possibility of influencing when and where phase transitions occur is affected by modifying the degrees of freedom for maneuvering by either increasing the dimensionality allowed for deconfliction (allowing vertical maneuvers) or decreasing the separation standard. When the density of the airspace became too great, resolving of some conflicts leads to more new conflicts with other trajectories. Under these conditions, conflicts will persist in the airspace, although not necessarily the same conflicts. Regardless of how many deformation cycles are executed in these conditions, the airspace will fail to converge to a solution. Although additional processing resolved some of these conflicts, new ones appeared, keeping the airspace in a continued roiling unresolved state.

In the disclosed system, the negotiated set of trajectories at any point in time is based on the best available knowledge of all parameters affecting the difference between the original desired trajectory and the current trajectory parameters. As changes are introduced into the system, the effects of these changes are accounted for in the replanning and, once a new plan is selected, a new set of negotiated 4D trajectories is established.

The most significant sources of uncertainty include the following:

Convective weather predictions

Wind field predictions

Airport capacity dynamics (as affected, for example, by wind-field changes and the resulting airport configuration)

Maneuvering of other aircraft

The disclosed system and technique represents weather cells (storms) as dynamical obstructions in the airspace. Trajectories automatically separate from these storms—as well as other aircraft. Storms are specifically designed to have unpredictable trajectories. A set of trajectories may be fully deconflicted at one point, but as a storm moves, new conflicts may suddenly arise—either directly from being too near the storm, or indirectly by the effects of aircraft moving away from storms creating new conflicts with other nearby aircraft.

Trajectory Management Algorithms

The disclosed system and technique utilizes a collection of algorithms, agent-based structures and method descriptions for introducing agency as a methodology for analyzing and managing the complexity of airspaces states while maintaining or increasing system safety. Described herein are the plurality of algorithms in the form of pseudocode—with the intent that software engineers can generate actual operational code in their language of choice for particular custom implementations. The code below assumes the programmer has already created the necessary object-oriented classes to represent the central abstractions of this genre of simulation, namely an airspace, aircraft, and dynamical trajectories. As described herein, these trajectories are represented using Control Points linked together by cubic splines. Other abstractions are also described below including Target Points, and their associated physics-like "forces", momentum, etc. These classes may be endowed with appropriate state as well as exogenous tuning parameters, the details of which are provided herein.

Although visualizations are immensely valuable in understanding the complex dynamics of these algorithms, the pseudocode provided herein is focused primarily on calculation algorithms, as the algorithms necessary for rendering of positional data in near real-time is considered to be within the competency of those reasonably skilled within the relevant computer programming in light of the teachings disclosed herein, whether such calculations utilize a general central processing unit or a graphics processing unit having multiple competing streams or cores. As such, no pseudocode for the visualizations is provided here, as this will be determined by the size and shape of the actual airspace to be monitored and given the fact that there are many possible visualizations one could utilize for this type of task.

The following algorithms are intended to enable tracking of the bulk properties of large numbers of enroute dynamical trajectories (and associated aircraft) in arbitrary airspaces. The pseudocode disclosed herein is intended to contain adequate technical detail to enable implementation in a language of choice on a hardware platform of choice and is organized by six tasks carried out by these algorithms. These tasks are described separately and accompanied by corresponding descriptions and flow diagrams.

The primary algorithmic tasks for the overall functions of acquiring, managing and displaying trajectories of aircraft within an airspace are organized into three main high-level tasks, with task number 2 containing separately defined sub-tasks, as represented by Pseudocode Sample 1 below.

Pseudocode Sample 1

1. Negotiation/Acquisition of aircraft trajectory data
2. Perform re-calculation cycles on trajectories, using the following sub-tasks: 6
   a. Apply repulsion/separation force to closest approach of conflicting trajectories
   b. Apply elasticity/smoothing force to all Control Points on all trajectories
   c. Apply bounding/limits force to all Control Points on all trajectories
3. Data analysis and visual display of aircraft trajectories, notification of successful/failed airspace, phase transition structure, etc.

Figure 16:
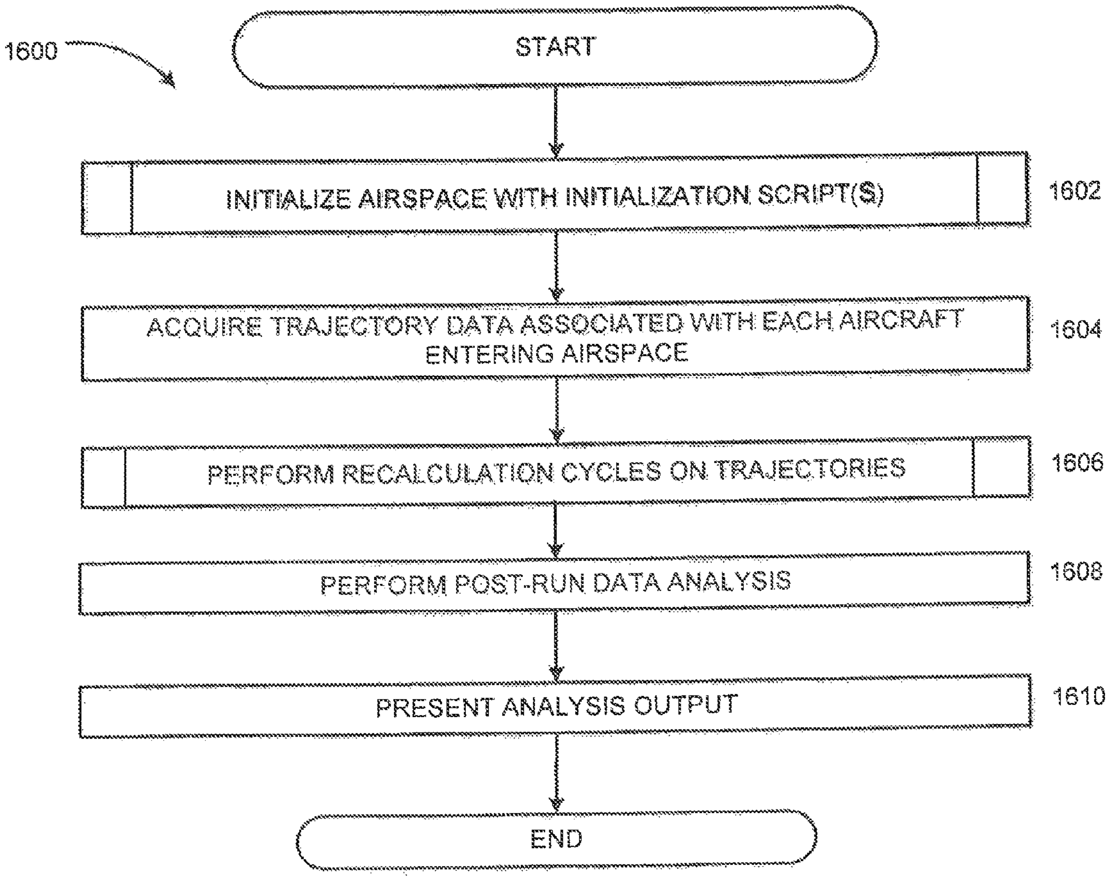
FIG. 16 is a flow chart illustrating an algorithmic process flow performed by the disclose system in accordance with the present disclosure.

FIG. 16 is a flowchart representing the processes of Pseudocode Sample 1. The routine 1600 begins at operation 1602, where the trajectory management engine 524 first initializes an airspace model defined by one or more data structures in memory with one or more initialization script. The data variables necessary for defining the airspace model in memory, as well as various parameter values associated therewith may comprise, but are not limited to, the following information, any values of which are for exemplary purposes and not meant to be limiting.

Airspace Data Structure Parameters

1. Airspace Model Identifier
2. Trajectory Count
3. Airspace Dimension Radius
4. vc=530 mph=cruising speed at cruising altitude
5. vmin,vmax=450 mph, 550 mph=speed range at cruising altitude
6. zc=30,000 feet=cruising altitude
7. zmax=42,000 feet=airspace ceiling limit
8. storm.rsep=20 nm=storm/aircraft separation Trajectory Data Structure Parameters 1. fleet_path_width=64=number of control points per trajectory
2. sim_interval=30.0=simulation heartbeat
3. node_interval=180.0 seconds=time between control points
4. time_scale=60.0=visual simulation time compression factor (sim seconds per real second)
5. MetaTime
6. FlightTime Trajectory Meta-Forces Parameters 1. conflict_buffer_zone=6.0 km=width of zone outside of the conflict zone where repulsion is active and decreasing with distance
2. repulsive_force=0.5=strength of force that increases separation at closest approach
3. elastic_force=8.0=strength of force that smoothes out trajectories
4. speed_limit_force=2.9=strength of force that moves speed toward cruising speed
5. altitude_force=0.55=strength of force that moves aircraft toward cruising altitude
6. momentum_decay=0.8=proportion of momentum that persists to the next cycle
7. storm_randomness=0.8=strength of randomizing force that blows storms around Once the airspace model 580 is initialized, from operation 1602, the routine 1600 proceeds to operation 1604, where the trajectory management engine 524 acquires trajectory data associated with each aircraft profile as it enters the airspace. As described above, the trajectory data and/or aircraft profile associated with each aircraft may comprise, but is not limited to, any of the following information.

Aircraft Identifier
Default Cruise Altitude
Speed
Heading
Destination ID
Airspace Entry Time
Spatial Coordinates
Momentum Buffer
MetaTime
FlightTime
Control Points
Target Points
Confliction Flag
Confliction Trajectory ID The process of acquiring the aircraft profile and trajectory data for each aircraft may entail one or more of the process steps outlined with regard to Pseudocode Sample 2 and FIGS. 17A-B.

From operation 1604, the routine 1600 proceeds to operation 1606, where the trajectory management engine 524, as well as its constituent submodules 582-590, as illustrated in FIG. 5B, performs recalculation cycles on each of the aircraft trajectories 600A-N within the airspace model 580. In various embodiments, the trajectory management engine 524 may perform recalculation cycles on each of the aircraft trajectories simultaneously, or nearly simultaneously. The trajectory management engine 524 repeatedly perform the recalculation cycles on each of the aircraft trajectories 600A-N, at a frequency defined by heartbeat interval value currently associated with the airspace model 580.

More specifically, functional algorithms within trajectory management engine 524 and trajectory manager 582, in conjunction with modules 584-590, perform the dual function of 1) "flying" aircraft within any particular trajectory, and 2) every delta t of FlightTime, dynamically changing the trajectories themselves. The primary clock of using these algorithms is in FlightTime (seconds). FlightTime moves forward (incrementally increases in value) as the monitoring and control process proceeds. To "fly" an aircraft (forward), the location and velocity of an aircraft "flying" a trajectory are calculated by sampling the (appropriate cubic spline of the) trajectory at time FlightTime. These values determine the current location, speed, and heading of aircraft associated with an aircraft profile and optionally displayed in any visualizations. More importantly, every delta t of MetaTime, the trajectories themselves are re-calculated (replanned) according to current conditions. Naturally, only the future can be replanned. The past is, by definition, frozen to whatever path the aircraft actually flew. Additional details regarding performing the recalculation cycles will be provided with reference to FIGS. 18-21 herein.

From operation 1606, the routine 1600 proceeds to operation 1608, where the trajectory management engine 524 performs post-run data analysis providing any notification and/or a large regarding conflicting trajectories as well as, in conjunction with GPU 525 presenting a visual representation of one or more of the trajectories within the airspace, as well as any special audio or medical indicia indicating either successful or unsuccessful deconfliction of trajectories, as illustrated by operation 1610.

Note that, although Pseudocode Sample 1 lists the algorithmic tasks linearly, it will be obvious to those reasonably skilled in the arts that the tasks for acquiring aircraft flight data and recalculation of aircraft trajectories, as well as analysis and visualization of the trajectory data execute continuously following initialization of the airspace model and would be performed with one or more looping tasks depending on the hardware platform and specific software utilized to accomplish such tasks.

Spoxel Data Structure

One of the major challenges in monitoring the nation's airspace is the ability to monitor and track each aircraft within simulated system model. Particularly challenging is the need for computing trajectory deconfliction at very high speed because the system ideally is deconflicting extended objects (trajectories) rather than just having planes avoid each other (computationally much easier), a task which may require long and complicated sums and trigonometric calculations and polynomial root finding that would take too long. The goal was a million per second.

In order to simplify the calculations associated with each aircraft trajectory within the system model, a unique technique and data structure is proposed. Technique comprises mapping the physical configuration of the simulated system (airspace model 580) onto the architecture of computer memory 520 such that adjacency is preserved and that super-fast bit manipulation can be used to help in deconfliction calculations. In order to implement this process, each aircraft is associated with a new date data structure, termed a "spoxel" 625 which may be used to denote four dimensional digital elements in a space-time model, as illustrated in FIG. 15B.

If a "ten-minute" equivalent mapping is performed (about the current time window for strategic maneuvering), that translates into about 50 nautical miles at current jet speeds. Spoxellating the whole US at this scale (1500 nm×2500 nm) would give 1500 two-dimensional elements. The ten minute resolution would also give 144 elements in a day, and for starters, we could ignore altitude. This gives 144×2500=360 k spoxels. Even going to two-minute mapping resolution (about the scale where strategic becomes tactical) gives 45M spoxels, a large number but not unmanageable. Each trajectory T1 of FIG. 15B would produce an identifying string in a number of spoxels 625 roughly equal to (flight length)/10, typically about ten. To compute a new trajectory, it is a very fast query to inquire if any spoxel has more than one "mark" in it and then be used to recompute the affected trajectories. This can also be extended to immediate spoxel neighborhoods if need be, accounting for causality.

With the disclosed approach x, y space and time are organized and sorted into tiles, every path node or control point of every path were trajectory is sorted into its corresponding "Spoxel" tile. With this approach, only path nodes in a Spoxel or nearby need be considered. Note that the z dimension is not considered separately, so z's will share Spoxels. This approach trades off memory for computation cycles. Spoxel Size is the size is a function of the granularity of the system. Spoxel x,y size is the x,y separation minimum plus some buffer (e.g. 50%). The buffer is so paths attempt to stay farther away than minimum. Spoxel size in t time dimension is the continuous replanning delta T.

For 5000 km diameter airspace, 10 km separation+buffer, and a delta T of 1 min. The number of x, y tiles would be 500^2=250K. For 500 minute max flights, total Spoxels would be 250K×500=125M. With an object size of 4 bytes, total memory impact would be 500 M bytes, a memory requirement is well within the range of current computers.

Trajectory Negotiation and Management

Each trajectory within the airspace model is associated with a unique aircraft flying along the trajectory for the duration of its flight. The disclosed system and algorithms support multiple heterogeneous aircraft types, with varied flight characteristics, including default cruise altitude, speed, etc. For each aircraft entering the airspace and associated with a trajectory, a data structure is initialized including data parameters associated with aircraft profiles with varied flight characteristics, including default cruise altitude, speed, etc. such data structures may be stored in a mass storage device 520 of system 500 which may be implemented with any of a database in any number of central distributed or other database configurations, or something as simple as a spreadsheet form, associated with the either CPU 502 or GPU 525 executing the algorithms described herein.

The information and decision flow illustrated in FIGS. 17A and 17B are based on current data communication systems capabilities. The existing concepts of operation for TBO developed by the JPDO ([1][2]) provide a national architecture for implementing dynamically interacting trajectories. However, in the JPDO TBO Concept, distinction is made between strategic and tactical trajectory changes. In the disclosed system and techniques, strategic and tactical considerations are considered together, seamlessly. It is possible for the 5DT trajectory optimization function to account for the constraints in the airspace as it optimizes the trajectory of an aircraft and then has that trajectory sent to an aircraft via the data communication systems in use today.

As illustrated in FIGS. 17A-C, the underlying TBO trajectory negotiation between aircraft 576 and network interface unit 504 of system 500 may comprise the following six step protocol:

1. $5DT_1$ Reference Business Trajectory AS FILED-ATSP/AOC computes $5DT_1$, (AKA Reference Business Trajectory—RBT), optimized against available own-fleet, airspace and business constraints information. The ATSP/Dispatcher files this 5DT, which serves as the "Reference Business Trajectory," or the best business case flight plan for the operator/ATSP=Air Transportation Service Provider, for time at $5DT_1$ minus X minutes (X=time from flight plan filing to taxi).

2a. $5DT_1$-AS AUTHORIZED-ANSP computes $5DT_2$, optimized against available airspace and business constraints information at time=2. The ANSP sends $5DT_2$ to the Flight Deck, which serves as the initial airspace-case flight plan.

2b. Copy of 5DTi-AS AUTHORIZED-ANSP computes $5DT_2$, optimized against available airspace and business constraints information at time=2. The ANSP sends a copy of $5DT_2$ to the ATSP, which serves as the best airspace-case flight plan for the ANSP.

3. ATSP Re-computes $5DT_i$-ATSP re-computes $5DT_i$, optimized against ANSP-provided changes from $5DT_1$. If no replanning is required, ATSP accepts changes. If another renegotiation between the ANSP and ATSP were required, then the ATSP-ANSP cycle would produce $5DT_3$, for example.

4. $5DT_i$-Requested/Cleared—The Flight Deck manages $5DT_i$, including maneuvering within airspace safety and business policy criteria. Flight Deck identified change requests are sent to ANSP. If changes are acceptable to ANSP, ATSP is notified through copy function (Step 2b).

5. $5DT_i$ is Re-computed—Requested changes can be sent to Flight Deck then on to ANSP or from Flight Deck to ATSP then on to ANSP 6. 5DTi AS FLOWN-Aircraft location on $5DT_i$ is communicated to ATSP, where $5DT_{i+1}$ is replanned (optimized) against available constraints. As required, the ATSP requests updated $5DT_{i+1}$, based on business criteria, and the cycle repeats with Step 1.

5DT Trajectory Theory

Prior to reviewing the algorithms necessary for recalculation of trajectories, it is appropriate for some background discussion of trajectory theory and trajectory transformation in light of the airspace model context. At the most elementary physical level, the airspace consists of air, aircraft and obstacles, e.g. weather cells, closed airspace, etc. However, since aircraft move over time, the disclosed system and technique represents the dynamical moving aircraft with the abstraction of trajectories, which are more useful in representing many issues in airspace design and management. Still further, the system and technique handles such trajectories as dynamical entities which are continuously (in practice, every small discrete Δt) re-calculated (replanned) while an aircraft is in flight as required by the combination of an interacting system of trajectories combined with an evolving system of constraints, such as weather or unforeseen flight alterations, which can emerge over time.

With such abstraction of dynamical trajectories and adaptive replanning, comes two time parameters for consideration. The first is the time endemic to the passage of origin-to-destination time within trajectories, namely flight time (FlightTime variable in our algorithms, as described herein. Second, there is an additional meta time (MetaTime variable) over which the trajectories themselves change. Such time variables may be seen as "from" time and "to" time and the state of the airspace at a given future time may change depending on what time it is being computed and forecast from, as new information is constantly arriving.

Figure 1:
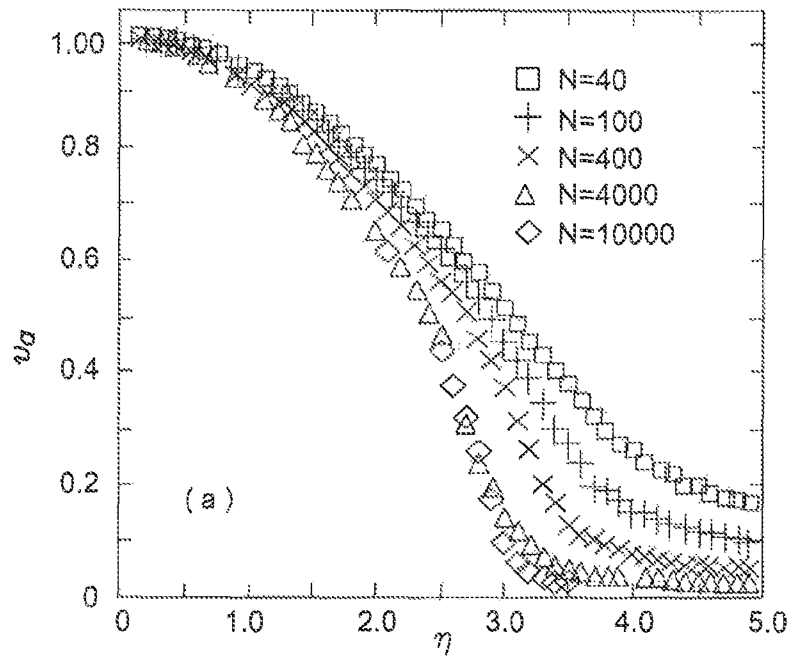
FIG. 1 (Prior Art)
FIG. 1 is a graph illustrating phase transitions and noise.
Figure 2:
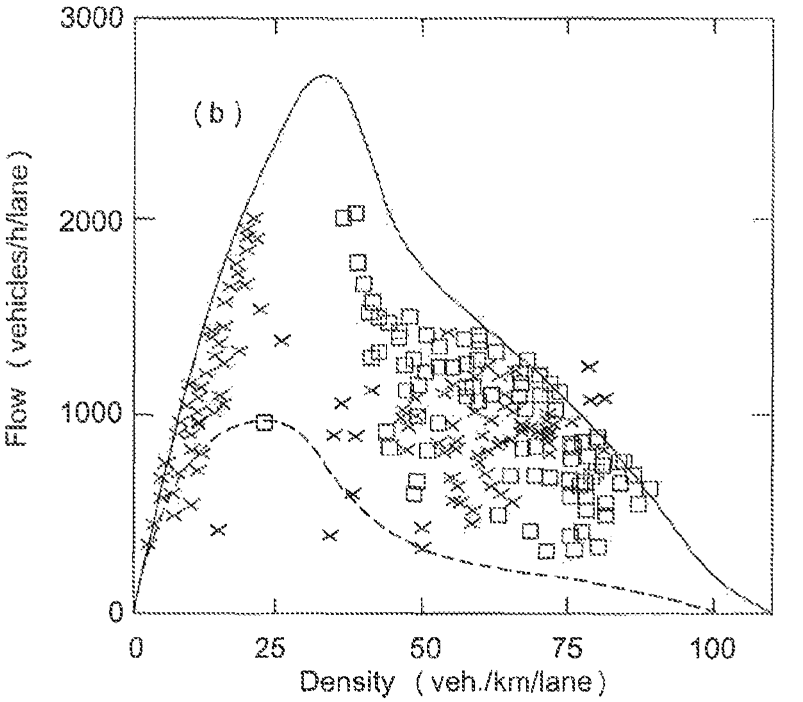
FIG. 2 (Prior Art)
FIG. 2 is a graph illustrating the results of a prior art traffic phase study.
Figure 3:
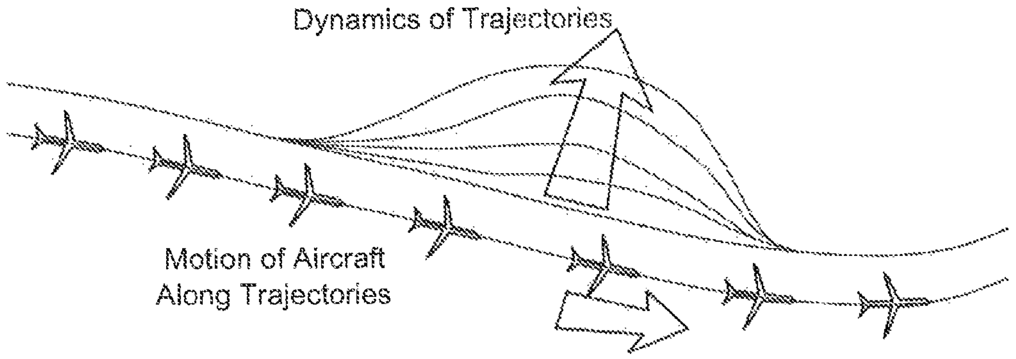
FIG. 3 illustrates conceptually a Five Dimensional Trajectory in accordance with the present disclosure.

FIG. 3 illustrates conceptually a Five Dimensional Trajectory (5DT, three position variables plus current time and future time variables). Over time, the trajectory itself is deformed according to physics-like "forces" exerting pressure on the trajectory, thus changing its shape. The deformation might be to achieve minimum separation or to avoid weather.

Trajectories

Conceptually, dynamical trajectories are abstractions spanning both space and time. Hence trajectories are 4DT, i.e. 4 dimensional location and one time dimension. However, due to the exigencies of airspace, trajectories may need to be replanned dynamically. In the disclosed algorithms, at every delta t time increment, all the trajectories are replanned (re-calculated) according to current conditions and are, quite dynamical. In the disclosed system and technique, 4DT Trajectory itself is considered a dynamical entity, replanned every delta t, which produced two types of time. There is the flight time embedded into every instance of a trajectory.

Every trajectory also changes itself over time so, an additional MetaTime variable is included, which gave each trajectory 5 dimensions (3 dimensional location plus 2 time dimensions-FlightTime and MetaTime.

Intuitively, a single trajectory instance is like a hard strand of spaghetti lying still on a cold plate—whatever curve it has is statically fixed in place. A collection of dynamical (suite of changing) trajectories is like a soft strand of spaghetti curling, stretching, and moving away from other strands of spaghetti in a pot of boiling water. Over the course of its flight time, an aircraft might fly parts of many dynamically replanned trajectories. An actual flown flight path is, in effect, pieced together from many instances of trajectories as the dynamical replanning process re-shapes the trajectory in MetaTime, responding to maintain separation or avoid weather.

The concept of 5DT is illustrated with the airspace model 400 of FIG. 4 in which a trajectory itself is modified. The future of any particular trajectory has a FlightTime associated with it. In addition, trajectories are modified at some time t in MetaTime as well.

Trajectory Generation and Deconfliction

Typical optimal long-range vertical profiles for commercial jet transport aircraft consist of optimal ascent and descent segments connected by a long cruise-climb or step-climb segment. Optimal horizontal routes are not as easy to compute because the variations in the wind field lead to a non-convex nonlinear optimization problem with potentially many regions of local minima. As a result, approximate optimization solution approaches must often be considered even before the added complexity of deconfliction is factored in.

In order to generate dynamic optimization (continuous replanning) and deconfliction of thousands of trajectories and observe realistic emergent collective phenomena, a number of algorithmic accelerations are employed. The disclosed system and techniques utilize scalable heuristics based on pseudo-potential methods to achieve rapid systemic deconfliction. To incorporate intent and optimize path dependent measures, such as time and fuel burn, a concept from theoretical particle physics, the notion of an ensemble of interacting extended objects ("strings") is employed. Such extended objects are identified with two candidate 4D aircraft trajectories T1 and T2, depicted in airspace model 400 of FIG. 4. Strings are endowed with a distributed pseudopotential so that they repel each other, an extension of traditional pseudo-potential methods where the objects themselves repel each other, and the charge is sufficient such that required separation is maintained. In FIG. 4, aircraft trajectories T1 and T2 are endowed with repulsive pseudopotentials. The circles represent time slices in the predicted future. Separation is maintained by the pseudopotential deforming the strings, which distribute the deformation along their length so as to reduce curvature to acceptable levels.

Initial Trajectories

By convention, the altitude of the endpoints of every trajectory is the default cruise altitude of the particular aircraft flying the trajectory at the time it either enters or exits the monitored airspace.

The velocities of trajectories at the entry and exit points at the edge of the airspace have direction as known at the time of entering and a magnitude equivalent to the default cruise speed of the associated aircraft. These entry and exit points can be from the departure airport gate to the arrival airport gate, including all moving of the trajectory on the ground, to takeoff, to the landing, surface movement, and arrival at the destination airport gate. Alternatively, the entry and exit points can be anywhere along the trajectory, during cruise for example, and from the top of descent to the arrival point on the destination airport.

Once the aircraft profile for each and aircraft entering the airspace is acquired, an initial trajectory path is created in the form of a cubic spline connecting the entry and exit points of the airspace. Since entry and exit points are likely offset from one another, trajectory paths will likely be curved, following the shape of the cubic spline.

Cubic Splines

In the disclosed system and techniques, cubic splines are used extensively in representing trajectories here, as well as in all of the calculations of forces applied to trajectories to move and modify them. A natural way of representing curves is with polynomials, which have the convenient property that they are easily differentiable for ease of inter-calculating locations, velocities, and accelerations. In addition, polynomials are computationally efficient.

For trajectories, the location and velocities of both end points are encoded into the polynomials. Hence, a third degree (cubic) polynomial is used. Once defined, any point along a cubic spline can be quickly sampled for location, velocity, and acceleration.

The use of control points for cubic splines in graphics applications is known, however, the control points utilized herein are different, in that graphics applications typically use four control points to define each segment. The system and techniques disclosed in utilize cubic Hermite splines, which are defined by two control points with velocity as well as position, and all control points are on the trajectory. A control point is simply the position and velocity of the desired trajectory, sampled at a specified time. This difference is due to the interest in time and velocity, which is not shared by graphics applications.

Control Points—Representing Complex Trajectory Path Shapes

Although trajectories are initialized as simple cubic splines connecting entry and exit points on the perimeter of the airspace, as trajectories need to deform to maintain separation from other trajectories, they will need to take on more complex shapes.

In order to represent arbitrary complex curved paths though the airspace, trajectories are endowed with "Control Points", spaced regularly in time, one Control Point every delta t (DeltaFlightTime) along the entire trajectory path. Control Points are connected together with cubic splines.

Hence trajectories are actually a set of many cubic splines, connected together via Control Points. Although the initial trajectory is calculated as a single cubic spline connecting the entry and exit points of the airspace in a single graceful curve, in fact, this single spline is sampled at each time t of each of the Control Points of the trajectory, and the full cubic spline trajectory is re-represented as a set of cubic splines. Once represented in this compound spline fashion, it's still the same curve, but has much more flexibility to be deformed as forces are applied to it later in the process.

Figure 6:
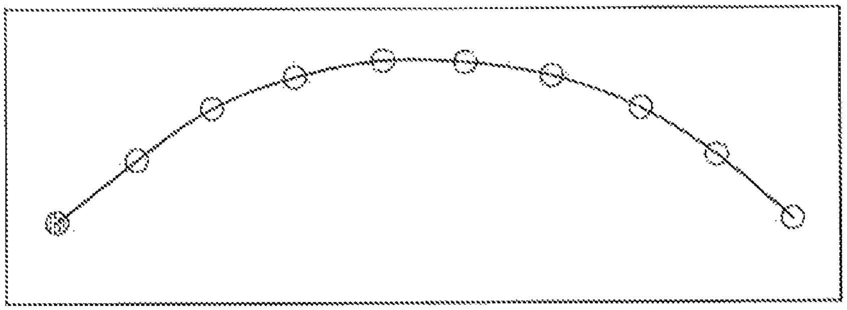
FIG. 6 illustrates conceptually a trajectory represented by a set of control points connected by cubic splines in accordance with the present disclosure.

Below FIG. 6 shows a single arced cubic spline represented as 9 shorter (almost linear) cubic splines, connecting 10 Control Points. (The yellow Control Point marks the beginning Control Node at the entry to the enroute airspace.)

Although in principle trajectories may have an arbitrary number of control points, in a disclosed embodiment, for illustrative purposes only, implementations of these algorithms use Control Points to 64 per trajectory. So, for example, with a 1000 km wide hypothetical airspace, can have about one Control Point per minute of Flight Time.

As described above, Control Points are used to represent and define the path of a trajectory. A trajectory consists of one Control Point for each delta t of its path. Control Points are connected together by cubic splines.

In an illustrative embodiment, Control Points may be represented by 7 double-precision values:

Time, in seconds, in Flight Time—constant 3 x-y-z spatial coordinates, in kilometers 3 x-y-z velocities, in km/sec When a trajectory is altered (changed to a different trajectory), the values of one or more Control Points are changed. In particular, a Control Point can be changed by revising the values of the spatial and/or velocities. Note that the Flight Time associated with the Control Point is immutable, i.e. is a constant.

5DT with Replanning

Conceptually trajectories are abstractions spanning both space and time. Hence trajectories are four dimensional entities—one temporal and three spatial dimensions. However, due to the exigencies of airspace, trajectories may need to be replanned dynamically. In the disclosed algorithms, at every delta t time increment, all the trajectories are replanned (re-calculated) according to current conditions. The calculation may or may not actually result in changed paths. But if needed, trajectories will be re-shaped by altering one or more Control Points on the trajectories. Trajectories managed by these algorithms described here are quite dynamical.

Every 4DT Trajectory is itself a dynamical entity, replanned every delta t. Hence there are two types of time. There is the Flight Time embedded into every instance of a trajectory. But a trajectory itself changes over time. So there is an additional Meta Time as these 4DT trajectories themselves dynamically change over time.

In this sense, dynamical trajectories are abstractions spanning space and two types of time. Hence these dynamical (suites of altered) trajectories are conceptually five dimensional entities—two temporal and three spatial dimensions.

Over the course of its Flight Time an aircraft might fly parts of many dynamically replanned trajectories. An actual flown flight path is, in effect, pieced together from many instances of trajectories as the dynamical replanning process re-shapes the trajectory in Meta Time, responding to separation, etc.

The concept of 5DT is illustrated in FIG. 3 where a trajectory itself is modified. The future of any particular trajectory has a FlightTime associated with it. In addition, trajectories are modified at some time t in Meta Time as well. In FIG. 3 an original trajectory (blue), possibly modified to detour around some obstacle at some time t in Meta Time, thus generating modified trajectories. Each trajectory and its associated Control Points have time variables in Flight Time. In addition, these trajectory modifications occurred at some different flavor of time t in Meta Time.

Deforming Trajectories

The values of Control Points are informed by applying physics-like forces to the trajectories, producing Target Points for moving Control Points. In the algorithms for applying specific forces detailed below, all of the forces calculate some Target Point goal—regardless of how each force makes its specific calculation. The lingua franca for all forces is to calculate one or two Target Points per application of the force, which then directs the universal deformation machinery, described below. This simplifies and reduces the process of generating forces to only calculating Target Points. Once a Target Point is calculated, it is handed off to the general dynamical functionality for actual movement of the Control Points (change their positions and velocities) according to multiple forces acting simultaneously on each Control Point.

Moving Toward Target Points

Rather, than wholesale moving Control Points to these Target Points, the Control Points are instead moved toward the target goals incrementally. More precisely, these forces act to change the acceleration of a Control Point in some specified direction, causing it to eventually arrive there (or even beyond)—unless of course it is pulled in other directions by other forces. The actual effect of many of these physics-like forces acting in concert is to generate a constellation of effects on Control Points (more precisely accelerations on Control Points in MetaTime) toward various Target Points, which are summed and applied in aggregate to each Control Point. Hence the Control Points move in carefully coordinated ways, bottom up from the forces applied, thus deforming the trajectories toward the macro goals of separation and efficient flyable flight paths.

Magnitude of Force Effects

Figure 7:
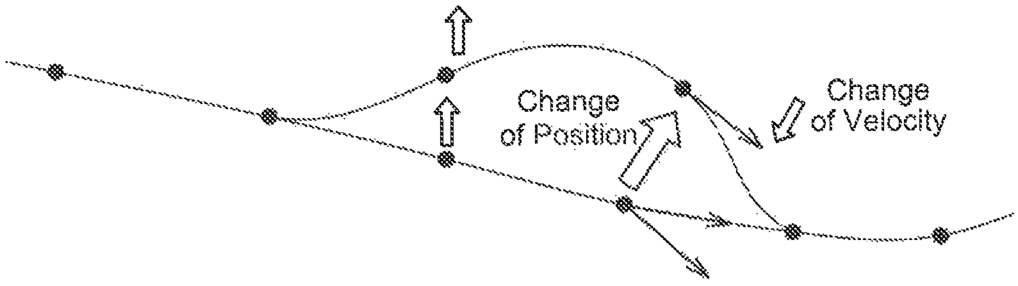
FIG. 7 illustrates conceptually forces acting on location and/or velocity of trajectory Control Points in accordance with the present disclosure.

Once a Target Point is identified by applying a force, the effect of the force is calculated as the difference between the current location of the point and the location of the Target Point. Differences are calculated in all 6 spatial dimensions of the Control Point—x y z position and x y z velocity. Such differences are multiplied by a constant and are then added to the Momentum Buffer. The effect is to implement a dynamic similar to Hooke's Law ($F=-kx$), where the farther away from the goal, the larger the force (and acceleration) towards the goal. In the case of separation, a sigmoid function is applied to the otherwise linear force, centered at minimum separation. As such, repulsion is applied up to the safety margin, but is significantly stronger below minimum separation. Accordingly, even a single separation violation is given increased importance (and acceleration in MetaTime), resulting in much quicker resolutions of airspaces, which if solvable, converge to zero conflicts quickly. FIG. 7 shows Control Point being moved according to current forces. Note that both location and velocity can be affected.

Re-Calculation Cycles

The primary rhythm of the dynamical airspace described here is to generate dynamically changing trajectories, one cycle every delta t in MetaTime. There can be arbitrarily re-calculation event along a trajectory. From the point of view of an aircraft, limited only by available computation cycles, there can be one trajectory re-calculation (replanning) cycle carried out every few seconds of Flight Time. Hence, in practice, this process of many re-calculations per aircraft enroute flight approximates continuous replanning of the aircraft's trajectory while it is flying. The system attempts to carefully deform the trajectories such that separation is enforced, and the paths are always flyable (i.e. velocity and acceleration limits are maintained).

Deformation (Sub-) Cycles

A secondary rhythm occurs within each re-calculation cycle. Multiple steps or sub-cycles are required to properly deform the current trajectory so as to respond to current pressures and urgencies (e.g. separation exigencies). In each deformation cycle, the trajectories are gradually and incrementally changed. All the deformation cycles taken together within a single larger re-calculation cycle may have a very large impact on trajectories, depending on the pressures at that moment in the aircrafts' journeys. These "pressures" are physics-like "forces" of repulsion, elasticity, etc., are applied to the trajectories. Before a re-calculation cycle, a trajectory has some set of Control Point values. After the re-calculation cycle, the Control Points may have new values, and, in effect, be a new trajectory). At this level of detail, the 7 values described above are necessary and sufficient for representing Control Nodes. However, during the re-calculation process itself, an additional state is required to coordinate the gradual deformation of the trajectories over many deformation cycles.

Momentum Buffer

The additional state needed to coordinate deformation is stored in the Momentum Buffer. Momentum, as implemented here, enables continually maintaining near-optimal trajectories over the course of entire flights. The purpose of deformation cycles is to iteratively calculate the underlying dynamics required to 'glide' or translate the trajectories into new positions in the airspace. This dynamic movement requires that the successive deformation cycles be tied together into one (apparently) continuous movement, guided by local pressures. This dynamical 'gliding' process is analogous to momentum (with friction) in physics. To link deformation cycles together to accomplish (apparently) continuous movement of trajectories, additional state is needed to augment the state already contained in the Control Points. This is captured in the Momentum Buffer, which stores the current state of dynamic movement of each Control Point. Using the principle of inertia, if a Control Point is moving in a given direction, the Momentum Buffer will enable it to keep it moving in that way, modulo friction.

For every Control Point, there is exactly one Momentum Buffer. It has the same structure as a Control Point with the exception of no need to repeat Flight Time (which is a constant in a Control Point). A Momentum Buffer has the following structure:

3 x-y-z spatial coordinates in kilometers 3 x-y-z velocities in km/sec (seconds in Flight Time)

As stated above, the purpose of the Momentum Buffer is to provide inertia to the trajectory Control Points during the deformation process, so forces on trajectories continue to have their effect over subsequent deformation cycles. For example, if part of a trajectory is being repelled by another entity (another trajectory, weather cell, etc.), the trajectory receives an initial push (acceleration in MetaTime) from the force of repulsion. With momentum functionality built in to this process, the initial push continues to push on the trajectory, even after that deformation cycle—into subsequent deformation cycles. Visually, this has the effect of trajectories gracefully gliding away from each other.

In addition to momentum, there is also a notion of friction. Momentum is attenuated every deformation cycle, thus gradually reducing the effect of previous accelerations applied to Control Points. Hence, trajectories glide to a stop in the absence of applications of new forces. Algorithmically, each Momentum Buffer accumulates the effects of the multiple forces acting on a Control Point, when they are then added to the values of the Control Point at the end of each deformation cycle. The Momentum Buffer retains its values across deformation cycles, although they are attenuated every cycle, resulting in an exponential decay of the original force.

Re-Calculations of Trajectories

Pseudocode Sample 2 below corresponds to task of performing re-calculation cycles on trajectories.

Pseudocode Sample 2

Figure 18:
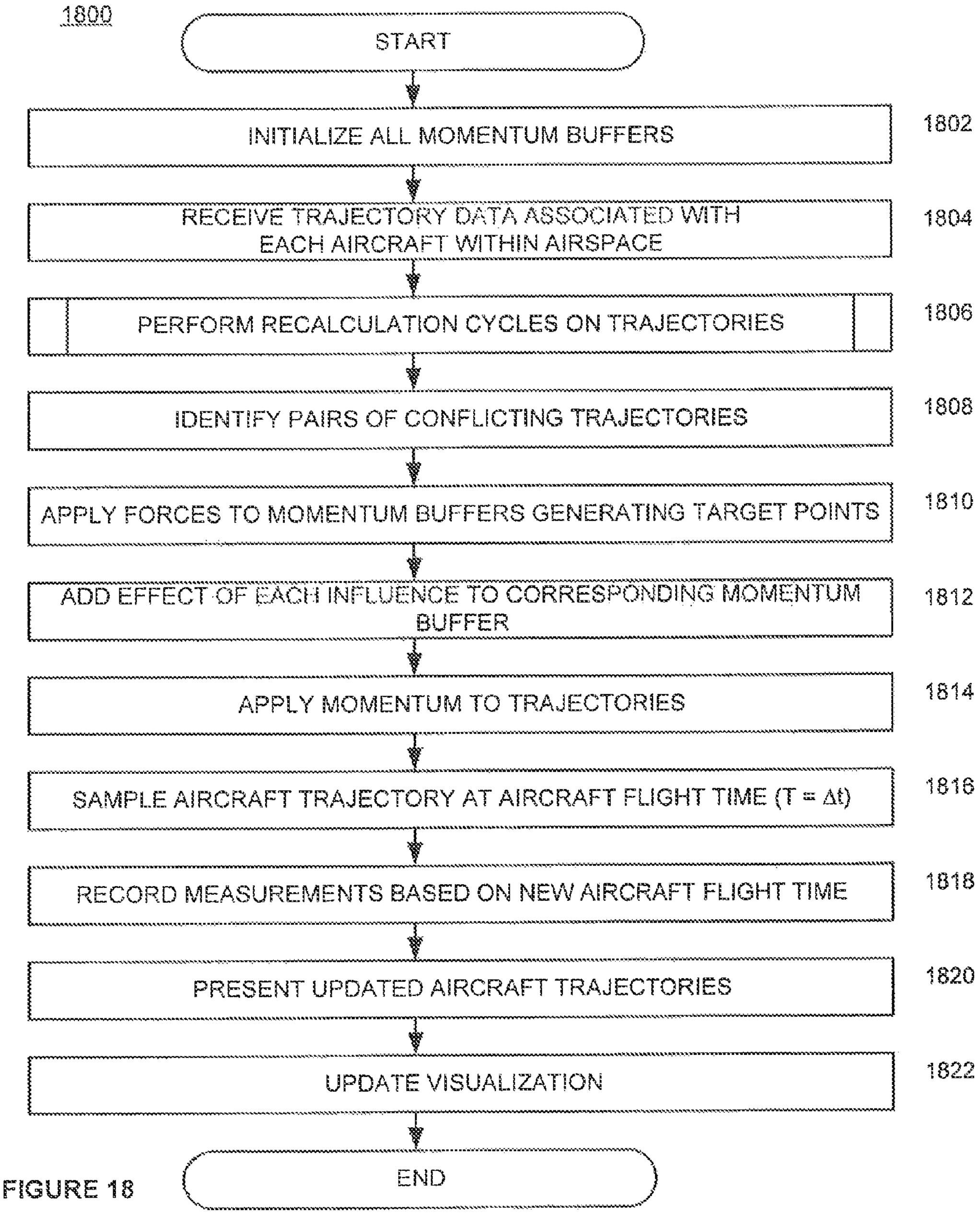

1. Run the trajectory initialization script
2. Initialize all the Momentum Buffers to zero
3. Repeat the following until the end of the simulation
  a. Repeat until deconflicted or maximum re-calculation cycles exceeded
    i. If maximum iterations exceeded:
      1. Note separation failure
      2. Either continue, or exit depending on preferences
    ii. Collect enumeration of all pairs of conflicting trajectories
    iii. Apply Forces to Momentum Buffers (generating Target Points)
      1. * Apply repulsion/separation force to closest approach of conflicting trajectories
      2. * Apply elasticity/smoothing force to all Control Points on all trajectories
      3. * Apply bounding/limits force to all Control Points on all trajectories
    iv. Add the effect of each force to its corresponding Momentum Buffer
    v. Apply Momentum to trajectories (according to target points)
      1. Add each Momentum Buffer to its corresponding Control Point, component by component
      2. Control points will have moved (changed location and/or velocity) some (small) amount where the Momentum Buffers were non-zero
    vi. Attenuate Momentum Buffers (analogous to applying friction)
  b. Fly aircraft forward one simulation time step (note: this is not one Control Point) by adding delta-t to the time value of aircraft, and sampling each aircraft's trajectory at this new time. (See section above on "Pseudocode: Flying Aircraft")
  c. Record measurements (density, number of conflicts, etc)
  d. Update visualization
4. Store data for later analysis FIG. 18 is a flowchart representing a process for managing trajectories of aircraft within an airspace. A routine 1800 begins at operation 1802, where the trajectory manager 582 retrieves momentum buffers for each trajectory within the airspace. Momentum buffers are storage locations where the current state of dynamic movement of each control point is stored. A momentum buffer as well as other data structures associated with an aircraft trajectory are initialized upon negotiation of the trajectory at the time of the aircraft entering into the airspace model. In various embodiments, the momentum buffers are capable of storing the three x-y-z spatial coordinates and 3 x-y-z velocities. From operation 1802, the routine 1800 proceeds to operation 1804, where the trajectory manager 582 retrieves trajectory data associated with each aircraft within the airspace. From operation 1804, the routine 1800 proceeds to operation 1806, where the trajectory calculator 584 performs recalculation cycles on all trajectories. In various embodiments, the recalculation cycles may comprise computing at least one of the repulsion, elasticity, bounding forces that are acting on the trajectories, utilizing repulsion module 586, elasticity module 588, and bounding module 590, respectively, under the direction of trajectory calculator 584.

From operation 1806, the routine 1800 proceeds to operation 1808, where the trajectory manager 582 identifies pairs of conflicting trajectories. In various embodiments, the trajectory manager 582 identifies pairs of conflicting trajectories by determining the separation distance between the trajectory of an aircraft and the trajectories of the other aircraft within the airspace. If the separation distance between the trajectory of an aircraft and a particular trajectory of another aircraft within the airspace is less than a predetermined separation minima associated with the airspace model, the trajectory manager 582 identifies the two trajectories as conflicting, including any audio or visual alarms and notifications associated with presentation of airspace data. From operation 1808, the routine 1800 proceeds to operation 1810, where the trajectory recalculator 584 applies forces to momentum buffers generating target points. In some embodiments, the trajectory recalculator 584 may apply at least one of the repulsion, elasticity, bounding forces to aircraft trajectories within the airspace. As a result, target points are generated that correspond to a vector towards which the trajectory is directed from the last known control point.

From operation 1810, the routine 1800 proceeds to operation 1812, where the trajectory recalculator 584 adds the effect of each of the forces or influences to the corresponding momentum buffer. From operation 1812, the routine 1800 proceeds to operation 1814, where the trajectory recalculator 584 applies momentum to trajectories. A momentum buffer as well as other data structures associated with an aircraft trajectory are initialized upon negotiation of the trajectory at the time of the aircraft entering into the airspace model. It should be understood that algorithmically, each momentum buffer accumulates the effects of the multiple forces acting on a control point, when the forces are then added to the values of the control point at the end of each deformation cycle. The momentum buffer retains its values across multiple deformation cycles, although the values are attenuated every cycle, resulting in an exponential decay of the original force. The momentum buffers are attenuated to simulate frictional forces that may be acting on the aircraft. The momentum buffers are initialized to zero for each new 5DT calculation. That is, as the aircraft all move forward one delta-t quantum of time, the entire airspace is recalculated at the new instant of simulated clock time. At such point in time, just before a full airspace recalculation is begun, all the momentum buffers are initialized to zero. The only history retained from the previous recalculation of the entire air space are the trajectory paths themselves (which may now get modified). Since every node for every aircraft trajectory has a momentum buffer, all of these buffers are initialized to zero at the beginning of this recalculation of the entire airspace. The re-calculating of the entire airspace takes a number of iterations. This takes computer time, but no time in the sense of "5DT" time, referred to as (regular time clocks-stopped) computer time "meta time". At each cycle of meta time, the momentum buffers are NOT re-initialized to zero. Rather, they retain an (exponentially attenuated) history of the results of previous meta cycles. Hence a "push" from a previously applied force (in previous meta time) still keeps pushing some amount in subsequent cycles, e.g. like a billiard ball keeps rolling even after the first shove, but gradually slows down too. To that extent, the trajectory nodes are like billiard balls which get pushed and shoved by a myriad of forces applied on them, and then slowly come to an equilibrium as trajectories assume mutually agreeable (separated, smooth, etc.) paths.

From operation 1814, the routine 1800 proceeds to operation 1816, where the trajectory recalculator 584 samples aircraft trajectory at aircraft flight time (t+δt). From operation 1816, the routine 1800 proceeds to operation 1818, where the trajectory manager 582 records measurements based on new aircraft trajectory flight time. In various embodiments, these measurements may include any of density, number of conflicts, etc. From operation 1818, the routine 1800 proceeds to operation 1820, where the trajectory management engine 524 in conjunction with GPU 525 presents updated aircraft trajectories and updates visualization via display 106.

Trajectory Deformation Forces

The Pseudocode Samples 1 and 2 provide a complete description of the control algorithms, including acquisition of each aircraft data within the airspace and data recalculation trajectories, however, there is still additional pseudocode needed apply physics-like 'forces' to the trajectories to deform them appropriately. These (sub-) tasks are:

a. Apply repulsion/separation force to closest approach of conflicting trajectories
b. Apply elasticity/smoothing force to all Control Points on all trajectories
c. Apply bounding/limits force to all Control Points on all trajectories Such subtasks are achieved utilizing the algorithms defined in Pseudocode Samples 3-5 herein which should be reviewed within the theoretical background set forth below.

Trajectories would remain unchanged if there were no pressures to change their paths. In a sparse airspace, initial trajectories can be quite stable with no need to change already optimal trajectory paths. However, in more dense airspaces, separation may force changes in paths—typically lengthening the paths to go around some obstacle. On the other hand, economic pressures will tend to force the path to be more evenly curved, to save fuel, fly more smoothly, etc. In addition, physical limits on velocity and acceleration will tend to force the path into more flyable shapes as well. The shortest possible path may not be flyable. In principle, our algorithms search for shortest flyable de-conflicted paths (modulo issues around local minima, etc.)

These practical requirements for trajectories can be conceptualized and implemented as physics-like 'forces' thus simplifying the problem, as well as simplifying the algorithms used to deform the trajectories. As noted, the disclosed algorithms support three types of 'forces' that act to deform trajectories, including: Repulsion and Elasticity and Bounding. For every deformation cycle, the three forces above are applied to some or all of the Control Points, depending on the type of force:

Repulsion—only on closest approach of pairs of conflicting trajectories
Elasticity—on every Control Point
Bounding—on every Control Point As described above, the result of applying a force is not to move a Control Point per se. The effect of a force is simply to contribute effects (more precisely accelerations in Meta Time) to Control Points, implemented in the algorithms as adding values to the Momentum Buffers.

Maintaining minimum (safe) separation between trajectories is arguably the most important constraint of the trajectory replanning process. Rather than doing conflict detection and resolution per se, the innate character of the trajectory strings or tubes is that they repel each other in such a way as to be always in a state of separation.

This method of separation is possible because entire trajectories are separated (throughout their entire length), as opposed to separating aircraft per se. In effect, there are no surprises postponed into the future except when new conditions arise, for example, changing weather conditions. Even then, entire trajectories are once again immediately and fully separated through the operation of repulsion.

The most complex force to apply is repulsion, because it is only applied conditionally—that is, only when conflicts are detected among pairs of trajectories. The process is additionally complex because conflicts themselves must be detected dynamically for each deformation cycle.

New conflicts may arise for a trajectory resulting from de-conflicting some other pair of trajectories. In addition, weather cells may move between one re-calculation cycle and another, generating new conflicts with the storm, reverberating to new conflicts between other previously deconflicted pairs of trajectories.

Conflict Detection

One function of the Trajectory manager 582 is, at the beginning of each deformation cycle, the repulsion algorithm requires an enumeration of the set of all pairs of trajectories that are currently in conflict—and if conflicting, the algorithm needs to know the precise points of closest approach for each trajectory.

The simplest algorithm for this is to exhaustively search all possible pairs of trajectories, for those for which the closest approach is less than the minimum allowed separation. There is no simple analytic expression for the closest approach of two cubic splines. However, a numerical approximation is fast and practical. In the disclosed system and techniques, the algorithms sample the cubic splines at a granularity of 32 samples between each pair of Control Points.

The simple exhaustive algorithm for conflict detection described above scales as the square of the number of trajectories. Hence, for large numbers of trajectories, optimizing the conflict detection algorithm becomes a priority. There are a number of candidate optimization algorithms. The most straightforward approach is to 'tile' the 4DT space, and annotate the tiles with all the control points that fall within corresponding tile areas. Since control nodes tend to move slowly, so the content of the tiles is fairly stable, this approach is quite efficient, scaling linearly with the number of trajectories.

Repulsion/Separation Algorithm

Rather than doing conflict detection and resolution per se, the trajectory strings or tubes were designed to repel each other in a manner that always maintains required separation. This method of separation was possible because entire trajectories were separated (throughout their entire length), as opposed to separating individual aircraft. In effect, no surprises are postponed into the future, unless new conditions arise, for example, changing weather conditions. Even then, entire trajectories are again immediately and fully separated through the operation of repulsion.

The purpose of applying the repulsion force to a trajectory is purely to generate Target Points that can be turned into changes on Control Points as described above. This section describes how separation encounters generate Target Points.

In the disclosed algorithms, an arbitrary value notion of minimum separation is used (e.g. 5 nm). In addition, the notion of a "margin" of separation is added (e.g. 2 nm). When a conflict is found, the disclosed algorithms use a separation goal of minimum separation plus an extra margin (e.g. 5+2=7 nm). This policy enforces extra safety while guarding against some potential oscillations at the boundary of the separation minimum. Hence the Target Point is constructed based on this more aggressive separation distance, including the margin.

Figure 8:
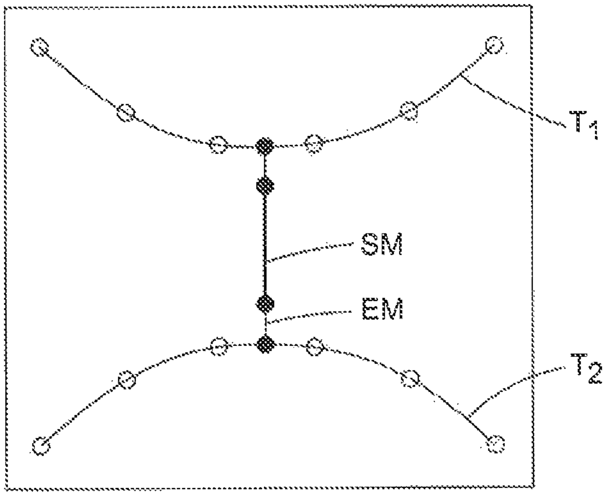
FIG. 8 illustrates conceptually two adequately separated trajectories in accordance with the present disclosure.

FIG. 8 illustrates two trajectories T1 and T2 within airspace model 400 that are adequately separated. The two trajectories T1, T2 are just at the minimum desired distance apart including the less dark margin EM. The trajectories are illustrated with control nodes marked as points. Separation minimum SM (e.g. 5 nm) is displayed darker, with the extra margin EM displayed less dark. In this case, there is no separation issue, so no repulsive force need be applied.

Figure 9:
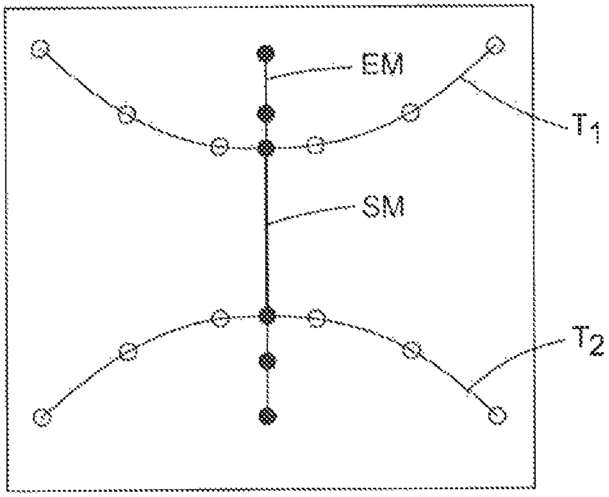
FIG. 9 illustrates conceptually two trajectories in conflict, i.e. not adequately separated in accordance with the present disclosure.

FIG. 9 illustrates conceptually a separation conflict. The trajectories T1, T2 are too close to each other, indicated by the vertical line segment SM, which is longer than the shortest distance between the two trajectories (at the same time t). The trajectories are illustrated with control nodes marked as points. Separation minimum SM (e.g. 5 miles) is displayed darker, with the extra margin EM displayed less dark. In this case, the two trajectories T1, T2 are too close in space-time, so separation will be attempted by applying a repulsive force to both trajectories T1, T2.

In an attempt to resolve this conflict, a repulsive force will be generated on both trajectories (or just one aircraft trajectory if the other is a weather cell, etc.). Since the point of closest approach (and greatest conflict) is between Control Points, that point on each trajectory cannot be directly moved. Instead Target Points are calculated for adjacent Controls Points on each side of the conflict.

Figure 10:
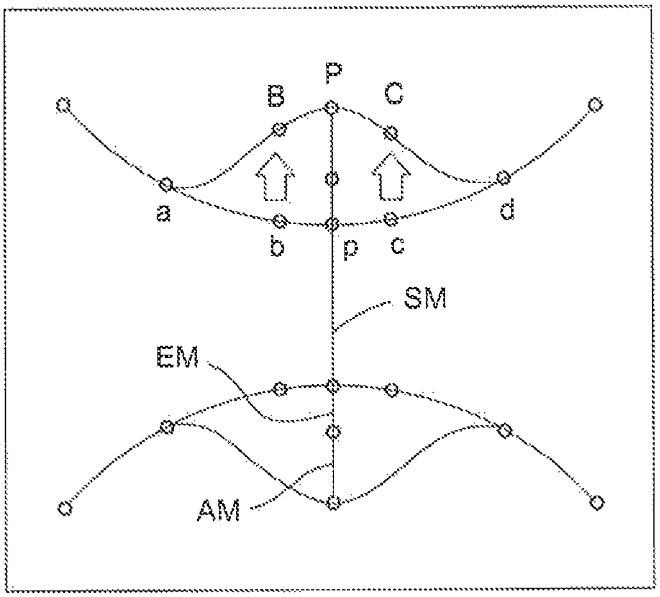
FIG. 10 illustrates conceptually deconfliction generating Target Points in accordance with the present disclosure.

The diagram in FIG. 10 shows the algorithm for calculating the Target Point B for current point b, and likewise, the Target Point C for current point c. Target Points B and C are calculated by sampling the cubic spline a-P at time b, and cubic spline P-d at time c. Once Target Points B and C are calculated, the process of moving Control Points is handed off to the higher-level deformation algorithms described above.

Figure 11:
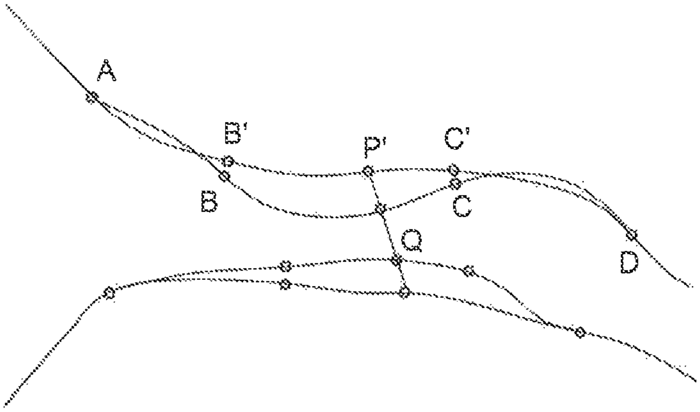
FIG. 11 illustrates conceptually spline-based trajectory physics in accordance with the present disclosure.

FIG. 11 provides another look at the process of at the generating Target Points from deconflicting two trajectories. FIG. 11 uses P and P' notation, but otherwise is similar. The trajectories are suggestive of a wider range of shapes than FIG. 10. Otherwise, FIGS. 10 and 11 describe similar dynamics.

Figure 12:
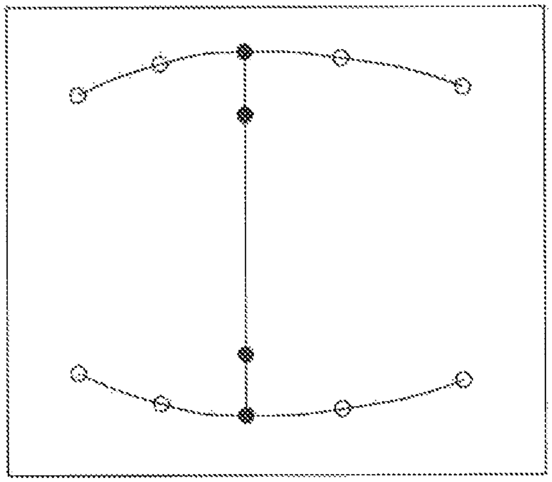
FIG. 12 illustrates conceptually successful deconfliction and resolution of two trajectories in accordance with the present disclosure.

Note that repulsion alone will tend to result in separated trajectories, yet with unseemly bumps. However, the elastic force will tend to smooth out any isolated bumps in trajectories, yielding smoother (and generally shorter) overall paths. FIG. 12 shows the results of multiple repulsion and elastic iterations, and the resulting separated and smooth trajectories. After a few repulsion and elastic iterations of deformation, the trajectories in FIG. 10 are separated, including extra additional margins AM, and smoothed as well.

Figure 13:
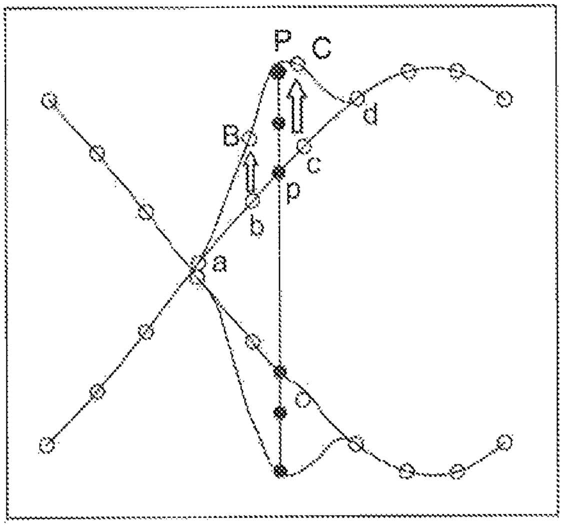
FIG. 13 illustrates conceptually two conflicting trajectories in space-time in accordance with the present disclosure.

The examples of trajectory conflicts are visually compelling. However, since the time dimension of the trajectories is not obvious, the point of closest approach at same time may not be where the trajectories appear to cross each other. FIG. 13 illustrates such situation. FIG. 13 is similar to FIG. 10, except that the trajectories appear to intersect. In fact the closest approach at the same time is where the vertical line is shown. Nevertheless, the process of determining the Target Points is the same as before.

Pseudocode Sample 3 corresponds to the sub-task of applying repulsion/separation force to closest approach of conflicting trajectories. Such pseudocode generates Target Points to implement repulsion/separation operations, (expanding and filling in the details of line 2.1.iii.1 of Pseudocode Sample 2).

Pseudocode Sample 3

Figure 19:
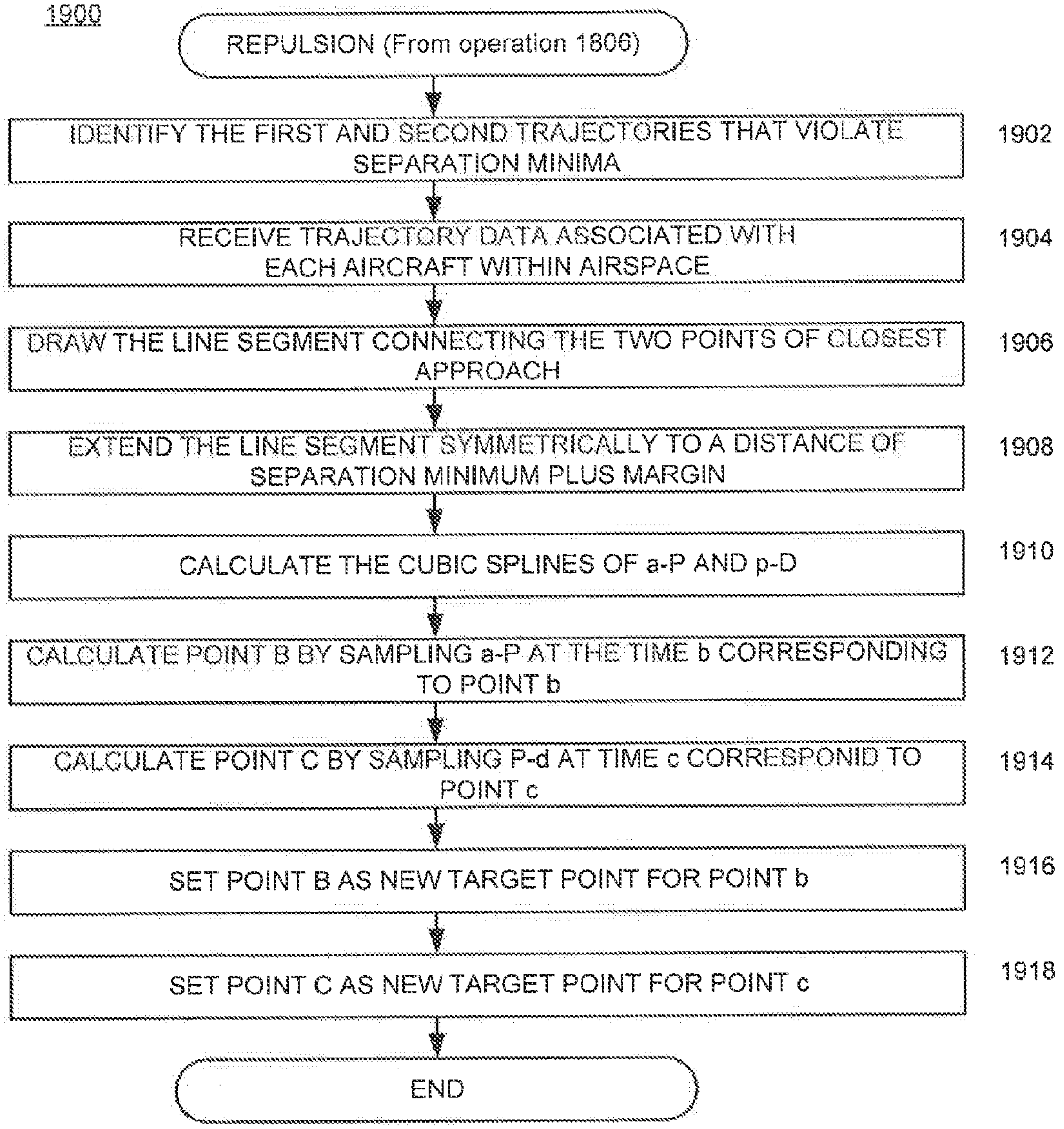

1. Begin with a pair of trajectories (or trajectory and a storm cell) that violate separation minima.
2. For each of the two trajectories (or one trajectory if the other element is a storm cell, etc.)
3. Find the point p of closest approach with the other trajectory (or storm cell)
4. Draw the line segment connecting the two points of closest approach of these two trajectories
5. Extend the line segment symmetrically to a distance of separation minimum plus margin
6. Point P is as the far end of this line segment in the direction away from the other trajectory
7. Point b is the nearest Control Point to point p in the downward time direction
8. Point a is the Control Point which precedes point b
9. Point c is the nearest Control Point to point p in the upward time direction
10. Point d is the Control Point which succeeds point c
11. Calculate the cubic splines a-P and P-d 12. Calculate point B by sampling a-P at time b (i.e. at the time corresponding to point b)
13. Calculate point C by sampling P-d at time c
14. Point B is a new Target Point for point b
15. Point C is a new Target Point for point c
16. Hand these two points off to the pseudocode for the high-level re-calculation algorithm above FIG. 19 is a flowchart representing a process for determining repulsion forces. A routine 1900 begins at operation 1902, where trajectory recalculator 584 identifies the first and second trajectories that violate separation minima. From operation 1902, the routine 1900 proceeds to operation 1904, where trajectory recalculator 584 invokes repulsion module 586 which identifies the point of closest approach (p) of first trajectory with second trajectory. From operation 1904, the routine 1900 proceeds to operation 1906, where the repulsion module 586 computes and stores in memory coordinate data representing a line segment connecting the two points of closest approach. From operation 1906, the routine 1900 proceeds to operation 1908, where the repulsion module 586 computes and stores in memory data representing extensions the line segment symmetrically to a distance of the value for the separation minimum plus margin. It should be appreciated that in various embodiments, the trajectory management engine 524 or any of the components thereof need not graphically render any of the trajectories, control points, target points, bisecting line segments, extensions thereof or margins, but may be able to calculate and store data representative of such data entities. From operation 1908, the routine 1900 proceeds to operation 1910, where the repulsion module 586 calculates the cubic splines of a-p and p-d. As described above in FIG. 10, point P is a point at the far end of the vertical line segment in the direction away from the other trajectory. Point b is the nearest control point to point p in the downward time direction. Point a is the control point which precedes point b. Point c is the near control point to point p in the upward time direction and point d is the control point which succeeds point c.

From operation 1910, the routine 1900 proceeds to operation 1912, where the repulsion module 586 calculates the point B by sampling a-P at time b corresponding to point b. From operation 1912, the routine 1900 proceeds to operation 1914, where repulsion module 586 calculates point C by sampling P-d at time c corresponding to point c. From operation 1914, the routine 1900 proceeds to operation 1916, where the repulsion module 586 stores point B as new target point for point b. From operation 1916, the routine 1900 proceeds to operation 1918, where the repulsion module 586 stores point C as new target point for point c.

Elasticity/Smoothing Algorithm

Applying a repulsive force for maintaining separation is a powerful technique. However, this force alone is insufficient for generating stable trajectories. Such paths are under specified causing instability of path locations, or "Brownian Motion" as paths remain restless. In these algorithms, an internal force of elasticity is applied to each trajectory causing the trajectories to follow ever more flyable, relatively shorter curved paths, conserving fuel, while still maintaining separation via the repulsive inter-trajectory force. Elasticity can be thought of the tendency for short sections of a trajectory to imitate the natural curve of longer sections of the trajectory. With the removal of obstacles, elasticity will return the trajectory to its initial cubic spline connecting the entry and exit points in the space. However, since obstacles are endemic to a crowded airspace, the force of elasticity will do its best under whatever circumstances and separation issues the trajectory finds itself within, in any particular moment. A beneficial emergent property associated with elasticity is that all of the applied forces tend to propagate throughout the airspace. "Pressure" from highly conflicted regions of the airspace cause outward expansion, thus reducing local density. Without elasticity, this emergent property of "pressure" is negligible. Elasticity is applied by using the same cubic spline mathematical algorithm used to generate trajectory paths from Control Nodes. The effect of this algorithm is to reduce accelerations along the trajectories. Reducing accelerations has the bonus of making trajectories more flyable.

Figure 14:
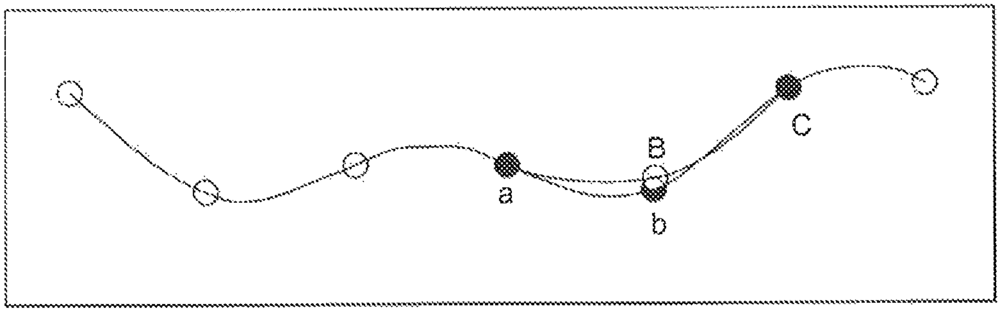
FIG. 14 illustrates conceptually applying the "force" of elasticity to Control Point in accordance with the present disclosure.

Elasticity acts on trajectories internally. In addition, this force only acts on Control Points, and only uses neighboring Control Points for the calculation. As with all forces in these algorithms, this force produces a Target Point. Elasticity is accomplished by reducing accelerations at Control Points. This has the effect of smoothing trajectories. The process of reducing accelerations makes use of the theorem that maximum accelerations on a cubic spline occur at their end points. Therefore, any point sampled on a cubic spline will have an acceleration less is than or equal to the accelerations at the end points. For a Control Point b with an excessive accelerations, consider the Control Points a and c adjacent to b. Construct the cubic spline a-c. Then generate point B by sampling a-c at time b. FIG. 14 illustrates the process of applying the "force" of elasticity to Control Point b on a trajectory. Construct the cubic spline a-c. Then generate point B by sampling a-c at time b. In FIG. 14, Point B is a Target Point for Control Point b—which can be used to guide deformation of the trajectory towards point B, as described above in the high-level re-calculation algorithms.

Pseudocode Sample 4 corresponds to the sub-task of applying elasticity/smoothing force to all Control Points on all trajectories. Such pseudocode generates Target Points to implement elasticity/smoothing operations (expanding and filling in the details of line 2.1.iii.2 and continuing from line 16 above).

Pseudocode Sample 4

Figure 20:
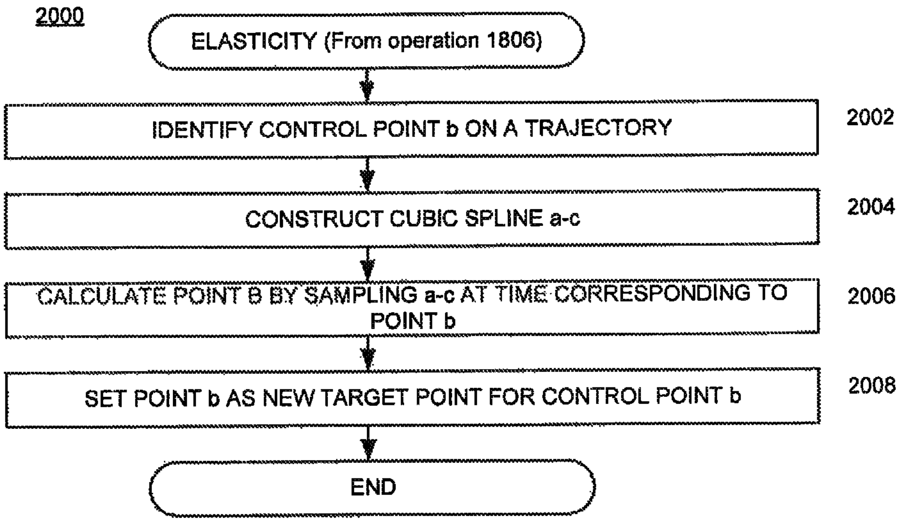

17. Begin with a Control Point b on a trajectory
18. Control Point a immediately precedes point b
19. Control Point c immediately succeeds point b
20. Construct cubic spline a-c
21. Calculate point B by sampling a-c at time b (i.e. at the time corresponding to point b)
22. Point B is a new Target Point for Control Point b
23. Hand point B off to the pseudocode for the high-level re-calculation algorithm above FIG. 20 is a flowchart representing a process for elasticity. A routine 2000 begins at operation 2002, where the trajectory recalculator 584 invokes elasticity module 588 which identifies control point b on a trajectory. From operation 2002, the routine 2000 proceeds to operation 2004, where the elasticity module 588 constructs cubic spline a-c. From operation 2004, the routine 2000 proceeds to operation 2006, where the elasticity module 588 calculates point B by sampling spline a-c at time b corresponding to point b. From operation 2006, the routine 2000 proceeds to operation 2008, where the elasticity module 588 stores point B as new Target Point for control point b.

Bounding/Limits Algorithm

There are three "forces" which act on trajectories: repulsion, elasticity, and bounding. The first two, repulsion and elasticity, deform the trajectories away from obstacles while maintaining smooth paths. However, without bounding aircraft speed within specified limits, the repulsion and elasticity algorithms might bring an aircraft to a full stop in the sky to wait out a conflict, or speed up excessively. Without limits on speed, solving a congested airspace will always succeed simply by expanding the trajectory snarl like inflating a balloon. In this fashion, some trajectories would go far out of their way to avoid conflicts, yet still arrive on time, but needing to fly excessively fast to do so. The bounding "force" acts on all trajectory Control Points to revise their trajectories towards a default cruising speed for the specific aircraft. Note that possible excessive accelerations of aircraft do not need to be handled by the Bounding/Limits algorithm. Accelerations are addressed by the Elasticity/Smoothing algorithm above. The Bounding/Limits algorithm is set forth below. For any Control Point, the default cruise speed for the aircraft (flying the trajectory) is the de facto Target Point.

Pseudocode Sample 5 corresponds to the sub-task of applying bounding/limits force to all Control Points on all trajectories. Such pseudocode generates Target Points to implement Bounding/Limits operations. (expanding and filling in the details of line 2.1.iii.3, and continuing from line 23 above.)

Pseudocode Sample 5

24. Begin with a Control Point p on a trajectory
25. Construct point P with same values as p
26. Change the velocity so its new magnitude is the default speed for the trajectory's aircraft
27. Point P is a new Target Point for Control Point p
28. Hand point B off to the pseudocode for the high-level re-calculation algorithm above This pseudocode continues as line 2.a.iv of Pseudocode Sample 2. Note that point p and point P have identical position—only the velocity may be different. The positions of the Control Point and the Target Point are same. Hence, the Bounding/Limits operation is harder to visualize.

Figure 21:
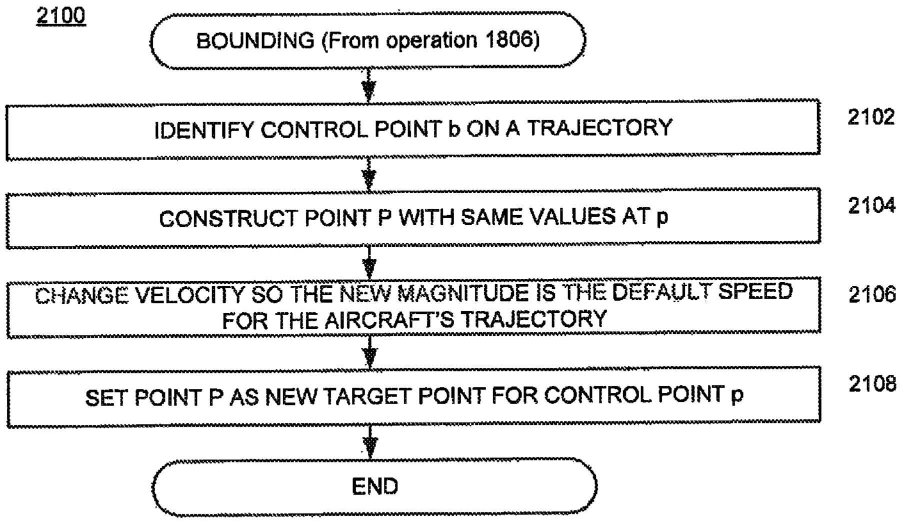

FIG. 21 is a flowchart representing a process for bounding in accordance with the disclosure. A routine 2100 begins at operation 2102, where the trajectory recalculator 584 invokes bounding module 590 which identifies control point p on a trajectory n. From operation 2102, the routine 2100 proceeds to operation 2104, where the bounding module 590 constructs point P with the same values at p. From operation 2104, the routine 2100 proceeds to operation 2106, where the bounding module 590 modifies the velocity value so the new magnitude of the velocity is the default speed for the aircraft trajectory n. From operation 2106, the routine 2100 proceeds to operation 2108, where the bounding module 590 stores point P as new target point for control point p.

In light of the foregoing, the reader may appreciate that the disclosed system and technique utilizes algorithms, agent-based structures to contact the existence of phase transition structure in an airspace as an "early warning" prior to "full" airspace, allowing the airspace "fullness" to be anticipated and remedied before the airspace becomes unsafe.

Below the disclosed system and techniques have been described with reference to trajectories for aircraft, including use of a multidimensional trajectory, it will be obvious to those recently skilled in the arts how these concepts may apply to other land, sea or other aircraft vehicles and how the simulation and management of trajectories associated with such vehicles can be similarly used to safely de-conflict two trajectories from each other or from various obstacles as well as identify when a particular travel space or area is approaching a phase transition.

As described herein, the disclosed system and techniques also provides pilots with advisory suggestions for making changes in an aircraft's trajectory that will reduce fuel consumption. Such tool, in the form of a software application, utilizes the algorithms described herein to position the aircraft in an optimal glide path, initially.

Fleet Trajectory Operations

According to another aspect of the disclosure, disclosed is a system and method for planning, disruption management, and optimization of networked, scheduled or on-demand air transport fleet trajectory operations from gate-to-gate (departure to arrival airport).

Existing flight planning, flight plan management, and air traffic services for aircraft fleet operations results in two shortcomings. These two shortcomings impose penalties in cost, fuel burn, carbon emissions, time, noise, and fleet capacity (seats available per day) compared to what is possible through trajectory-based optimization and airspace operations. First, the labor pool utilized by today's operators of on-demand fleets is excessive, when compared to the workforce required using the disclosed system for fleet management. Second, conventional flight planning and management creates a solution for time and fuel burn for an individual flight segment that is best suited for scheduled fleet operations (as contrasted with on-demand fleet operations). Second, existing air traffic services frequently result in a route of flight, altitude, and speed that varies significantly from the optimum solution for an individual flight segment (as contrasted with optimized and de-conflicted trajectories). Through the application of a fleet trajectory optimization and management system and trajectory-based air traffic management services, these penalties can be mitigated.

In prior art, systems and methods for managing air traffic flow have been limited to the optimization of individual aircraft flight segments, by individual flight plan. These methods provide for benefits to each individual aircraft cost and performance for a flight segment (takeoff to touchdown). The limitation of such past methods is that they do not account for the benefits possible by optimizing an entire fleet operation and allocating the resulting cost and performance assignments to each aircraft. According to one aspect of the disclosed system and techniques, the individual aircraft flight path trajectory information is optimized in the context of a large number of aircraft operating as a fleet, on interdependent flight segments, solving the limitation of prior art methods and producing benefits that go beyond the summation of individual aircraft flight path optimization benefits to include the network-induced benefits. The disclosed implementation results in savings in energy, emissions, and noise, and increases the number of fleet seats- or flights-per-day, and reduces empty seats- or empty flights-per-day.

In the existing National Airspace System, systems and methods for managing air traffic flow have been limited the optimization of individual aircraft flight segments, by individual flight plan. These methods provide for benefits to each individual aircraft cost and performance for a flight segment (takeoff to touchdown). The limitation of these past methods is that they do not account for the benefits possible by optimizing an entire fleet operation and allocating the resulting cost and performance assignments to each aircraft.

Figure 15A:
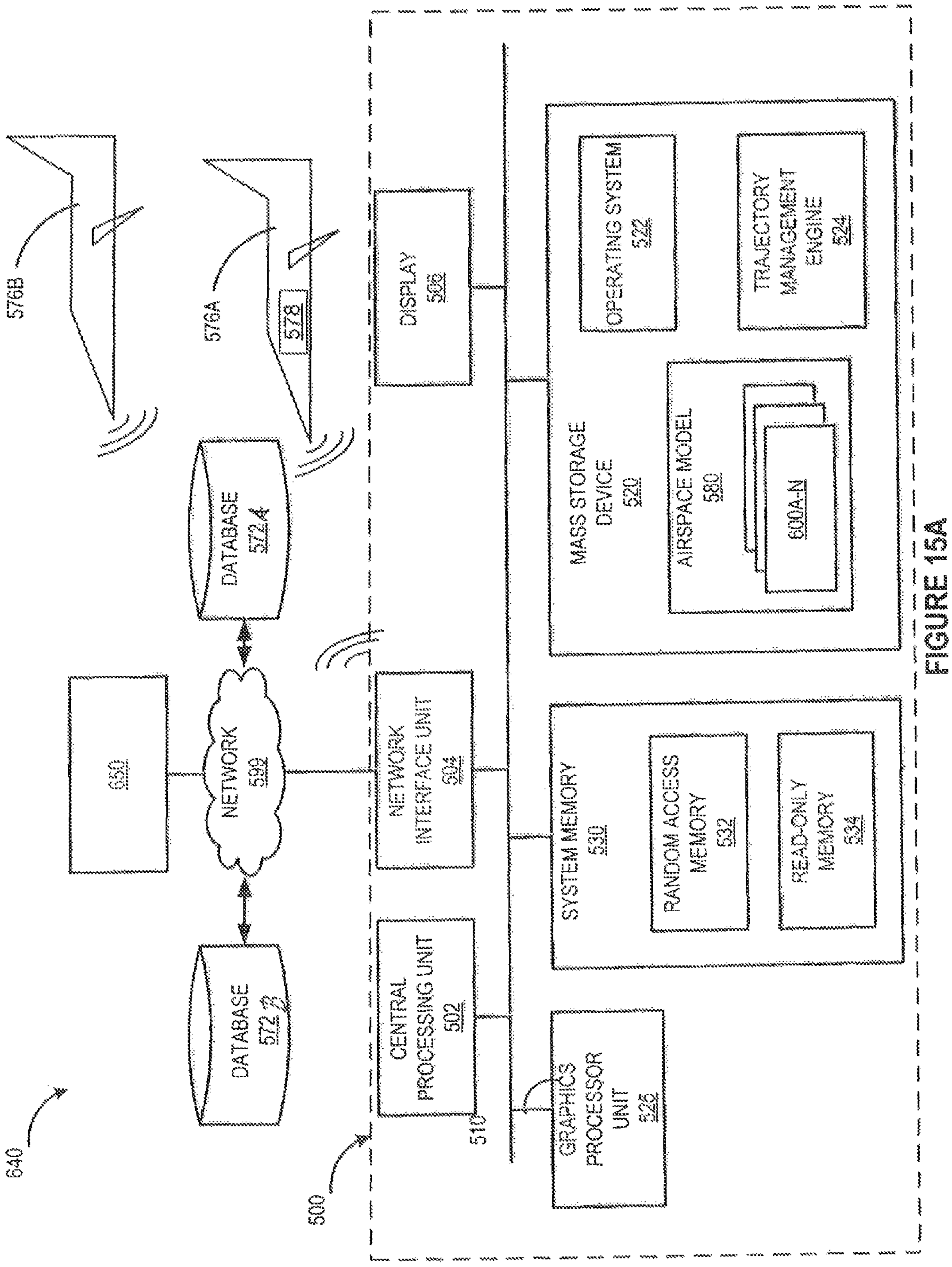
FIG. 15A illustrates conceptually a computer architecture for managing fleets of aircraft trajectories in accordance with embodiments of the present disclosure.
Figure 15B:
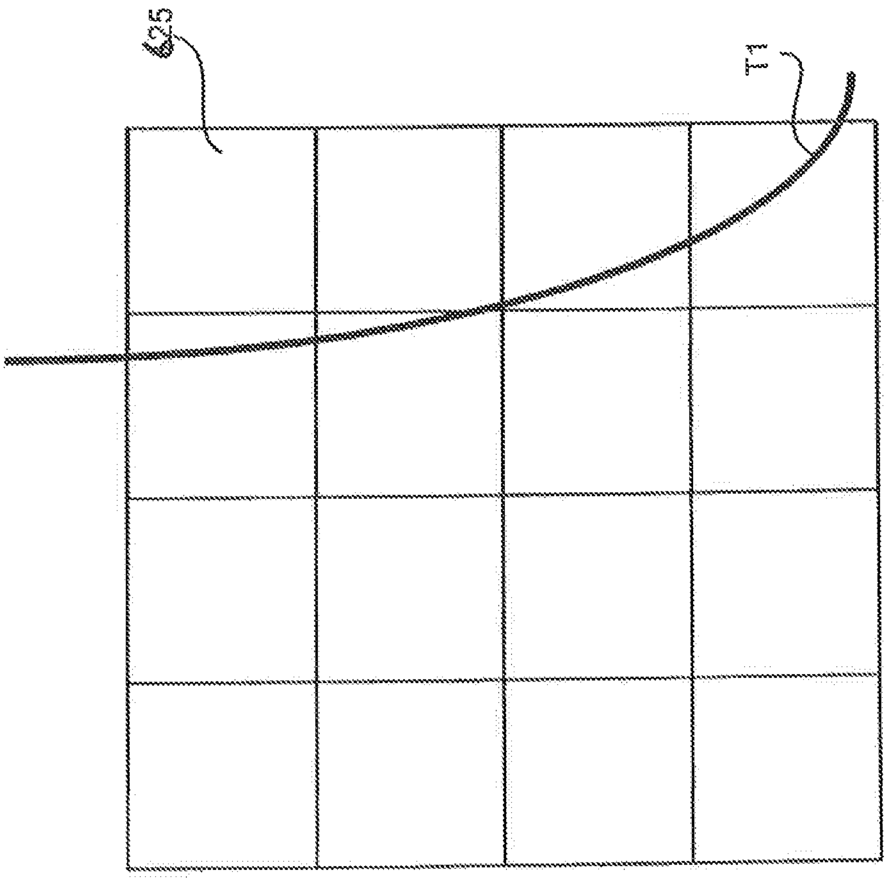
FIG. 15B illustrates conceptually a trajectory path traversing an array of spoxels in accordance with the present disclosure.

According to one aspect of the disclosure, system 640 of FIG. 15A combines the functions of generating, assigning, and communicating flight path trajectory information to aircraft in a networked, on-demand fleet operation for the benefit of optimizing the performance of the entire fleet in near real time. The information assigned and communicated to the aircraft includes, but is not limited to, altitude, speed, power settings, heading, required time of arrival (at points along the trajectory), and aircraft configuration. In one embodiment, the optimized parameters of fleet performance may include time, cost, energy, and environmental factors such as carbon and other emissions, and noise. The optimization period over which the generation of the flight path information is computed may include any of minute-by-minute, hour-by-hour, day-by-day, and annualized. In another embodiment, the flight path information communicated to the aircraft may be in the form of a secure, assured delivery protocol, machine language or other appropriate instruction format suitable for implementation directly into the flight or trajectory management computer system (a Flight Management System for example).

In the disclosed system and method, the individual aircraft flight path trajectory information is optimized in the context of a large number of aircraft operating as a fleet, on interdependent, de-conflicted flight segments. The disclosed system solves the limitation of past methods and produces benefits that go beyond the summation of individual aircraft flight path optimization benefits to include the network-induced benefits. This implementation results in savings in energy, emissions, and noise, increases the number of fleet seats- or flights-per-day, and reduces empty seats- or flights-per-day.

More specifically, a system and method is disclosed herein for optimizing the performance of a networked, scheduled or on-demand air transport fleet operations in near real time. The invention implements digital communication systems, high fidelity fleet tracking systems, fleet-wide trajectory optimization software, digital customer interface systems, weather information, National Airspace System infrastructure status information, and air traffic flow negotiation processes. The implementation includes near real-time information exchange, from a fleet command center (or Airline Operations Center—AOC) for flight trajectory management, to aircraft trajectory or flight management systems (a Flight Management System (FMS) for example), electronic flight bags (EFBs), pilots, or piloting systems. The input to the aircraft is made throughout the fleet that is operating in an interdependent, regionally distributed set of interdependent flight segments. The trajectory optimization calculations allow for frequent, near-real-time updating of trajectories (e.g., in seconds or minutes as appropriate to the need), to account for the impact of disruptions on each flight, based on the principle cost function being optimized (e.g., corporate return on investment for example). The disruptions accounted for include, but are not limited to, weather, traffic, passengers, pilots, maintenance, airspace procedures, airports and air traffic management infrastructure and services. The system operates by integrating aircraft flight plan optimization capabilities, real-time aircraft tracking capabilities, airborne networking data communication capabilities, customer interface, and a fleet optimization system. The benefits in fleet performance exceed the benefits possible only using individual aircraft flight plan optimization systems and methods.

The disclosed on-demand fleet operations employ aircraft and a command information center furnished with performance-based navigation, surveillance and communications capabilities, including a trajectory or flight management system (an FMS, for example) capable of required navigation performance, a transponder (or other position-reporting system) capable of providing near real time aircraft position from wheels rolling to wheels stopped along a trajectory, a command center equipped with fleet optimization software, an airborne networking data communication function, a digital customer interface, weather information, National Airspace System infrastructure status, and a digital interface with the air navigation services provider (FAA Air Traffic Control for example). These capabilities combine to provide the means for generating, optimizing, and distributing flight path trajectory management information for large fleets of interdependent aircraft flight segments in near real time.

At each point of a flight path trajectory, from wheels rolling at the start of the flight to wheels stopped at the end of the flight, system 640 of FIG. 15A, which includes the trajectory management engine 524 of system 500 provides current status and prognostic information to the command information center 650 and to the pilots of aircraft 576A-B, including, but not limited to speed, altitude, fuel consumed, fuel remaining on board, wind and other weather information, time remaining to destination, four-dimensional flight trajectory points flown and to be flown, and required times of arrival at points along the trajectory. The flight trajectory management engine 524 proposes an optimization of the flight trajectories for each flight in the fleet, based on optimum fleet performance.

System 640 can be implemented using existing technologies in the immediate future, with continuing improvements over the few years. Part 135 companies could be the immediate customers of this system. In the mid term, the innovation would be appropriate for marketing in the aviation sector to Part 121 (scheduled) operators, and perhaps to FAA Air Traffic Management as automation operations tools.

The system and technique disclosed herein can provide a trajectory optimization and real-time management system for operation of on-demand aircraft fleets. The system and method can be further refined for optimizing the performance of a networked, on-demand air transport fleet operation in near real time. The fleet optimization may be implemented through assignment and management of trajectories (flight plans) for each aircraft. These trajectories may be produced to satisfy multiple constraints, including customer-required destination time-of-arrival, minimized time-of-flight, optimized fuel burn (and carbon), and optimum Direct Operating Cost (DOC). These trajectories may be de-conflicted within an operator's fleet and the available regional air traffic flow data. The trajectories thus optimized may be referred to as "Reference Business Trajectories (RBTs)," and may include optimum as well as optional (sub-optimum) choices of routing, altitude, and speed. The disclosed system may submit and negotiate the RBTs with the FAA Air Traffic Operations and the aircraft fleet (through Electronic Flight Bags), in digital form. The system may supports Air Traffic approval of preferred routes for reduced fuel burn, reduced flight times, and reduced emissions through shorter segments flown at optimum altitudes, including seamless climb to cruise and optimal profile descents. These preferred routes would include Terminal En Route trajectories in the near term and RNAV/RNP trajectories in the mid-term.

The disclosed fleet trajectory optimization and management system 640 may be implemented as conceptually illustrated in FIG. 15A. System 640 comprises system 500 and specifically trajectory management engine 524, as disclosed herein to ensure management of trajectories for each craft in the fleet, including too jet trajectory separation and recalculation. System 640 further comprises a high fidelity fleet tracking system 645 which enables tracking of data from aircraft. System 645 may support the ITT ADS-B infrastructure, for example. In the farther term, additional multi-mode communication infrastructure options may offer the potential for robust and ubiquitous aircraft position information. The implementation of fleet tracking will have a stabilizing effect on fleet operations, reducing inefficiencies induced by lack of detailed aircraft position information. The fleet tracking system will produce trajectory-as-flown data that allows for more frequent and more accurate re-optimization runs by the system.

System 640 further comprises a digital communication system for communication between fleet aircraft 576A-B and system 640. In the near term, this function can be provided using Iridium devices on board aircraft with data compression through an existing STC-ed FDU that includes bi-directional digital communications and GPS interface for position reporting which augments tracking in airspace volumes not surveilled by ADS-B). Multi-mode (Internet Protocols over VHF, Wi-Fi, broadband, Satcomm) communication infrastructure may also be utilized system 642 provide robustness and ubiquity demanded in larger fleet operations.

Weather information, indicated in FIG. 15A as database 572A may be implemented, especially for winds aloft information, with DUATS to be used for the trajectory planning and real-time management function. For convective weather information, NOAA's Storm Prediction Center (SPC) may provide automated probabilistic thunderstorm height product that can be used initially for trajectory planning. For the longer term, System Wide Information Management (SWIM) offers the potential to significantly reduce the cost and time required to rapidly create accurate flight trajectory plans. The goal will be to produce accurate trajectory plans in seconds as contrasted with the length of time (and higher cost) of the existing flight planning process. An additional source of high-fidelity weather data is Airdat, Inc. which provides commercial weather forecasting services based on airborne-derived meteorological data feeds from sensors on aircraft.

National Airspace System Infrastructure status information indicated in FIG. 15A as database 572B may be implemented, with the existing NOTAMS system. This FAA system is being modernized and streamlined over the coming few years. The new SWIM system is planned to support very rapid incorporation of infrastructure and system information for trajectory (flight plan) development and negotiation with Air Traffic operations.

Air traffic flow negotiation processes may be performed utilizing the process illustrated with reference to FIG. 17A-B. The FAA is working toward automation of flight planning and trajectory-based systems as tools for air traffic managers. The existing tools include ERAM (en route automation management), URET (user request evaluation tool), TMA (traffic management automation), and others. The planned integration and automation of these tools leads to the ability of the future FAA Air Navigation Services Provider (ANSP) to accept, optimize, and re-negotiate trajectory plans with aircraft operators. The application of and expanded NextAero dynamic trajectory management capability would be applicable to the national airspace management functions.

System 640 disclosed herein provides near real-time information exchange between a fleet command center 650 and the aircrafts 576A-B. In this illustration, the aircraft are equipped with a flight management system (a Flight Management System (FMS) for example), electronic flight bags (EFBs), ADS-B IN and OUT, and digital communication capabilities. The trajectory information input to the aircraft is made throughout the fleet in near real time. The aircraft operate in an interdependent, regionally distributed set of flight segments. The trajectory optimization calculations allow for frequent updating of trajectories (e.g., approximately every 10-15 minutes) to account for the impact of disruptions on each flight. Trajectories are planned to satisfy the principle cost function being optimized (corporate return on investment for example). The disruptions accounted for include, but are not limited to, weather, traffic, passengers, pilots, maintenance, airspace procedures, airports and air traffic management infrastructure and services. The system operates by integrating aircraft flight plan optimization capabilities, real-time aircraft tracking capabilities, airborne networking data communication capabilities, customer interface, and a fleet optimization system. The benefits in fleet performance exceed the benefits possible only using individual aircraft flight plan optimization systems and methods.

The disclosed fleet trajectory management system serves as a foundation for a significant advancement in fleet network performance. Three performance benefits are possible: (1) reduced operating expenses for flight planning and flight trajectories management (fuel, time, and maintenance), (2) increased revenue through aggregation of passengers, and (3) increased daily "lift" (segments/seats per aircraft per day). The first two benefits accrue for both on-demand and scheduled operators; the third benefit accrues to on-demand operators.

The disclosed fleet trajectory management system serves as a foundation for a significant advancement in fleet network performance. Several performance benefits are possible: (1) reduced operating expenses for flight planning and flight trajectories management (fuel, time, and maintenance), (2) increased revenue through aggregation of passengers, (3) increased daily "lift" (segments/seats per aircraft per day), and/or reduced capital expenses (cost of equipment).

It will be obvious to those reasonably skilled in the art that modifications to the systems and processes disclosed herein may occur, without departing from the true spirit and scope of the disclosure. For example, any two elements which communicate over a network or directly, may utilize either a push or a pull technique in addition to any specific communication protocol or technique described herein. Further, notwithstanding the network implementation described, any existing or future network or communications infrastructure technologies may be utilized, including any combination of public and private networks. In addition, although specific algorithmic flow diagrams or data structures may have been illustrated, these are for exemplary purposes only, other processes which achieve the same functions or utilized different data structures or formats are contemplated to be within the scope of the concepts described herein. As such, the exemplary embodiments described herein are for illustrative purposes and are not meant to be limiting.

What is claimed is:

1. A non-transient memory apparatus containing a data structure usable with a computer system for representing a trajectory to be flown by an aircraft within an airspace, the data structure comprising:

A) X, Y and Z coordinate values within the airspace model;

B) a first time value representing a point along the trajectory;

C) a second time value representing a global time of the computer system; and

D) plurality of control point values representing points along a trajectory.

2. The apparatus of claim 1 the data structure further comprising:

E) a moment buffer value used in modifying a trajectory.

3. The apparatus of claim 1 further comprising:

a plurality of stored trajectory data structures, each trajectory data structure representing a trajectory to be flown by an aircraft within the defined airspace model.

4. A non-transient memory apparatus containing a data structure usable with a computer system for representing an airspace model comprising:

a plurality of trajectories, each trajectory representing a trajectory to be flown by an aircraft within the airspace model, wherein each trajectory is characterized by a continuous one-dimensional curve of finite length embedded in five-dimensional space-time defined by three spatial dimensions and two time dimensions.

5. The apparatus of claim 4 wherein a position along a trajectory is parameterized by a first time dimension value t and a current state of all trajectories is parameterized by a second time dimension value T.

6. The apparatus of claim 5 wherein present time is represented if t=T.

7. The apparatus of claim 5 wherein future time is represented if t>T.

8. A computer program product for use with a computer system, the computer program product comprising a non-transitory computer readable medium having embodied therein program code for managing flight performance parameters of a plurality of aircrafts within an airspace model stored in a computer memory, the computer program product comprising:

A) program code for upon entry of an aircraft into an airspace, acquiring data describing a trajectory for each of the plurality of aircrafts;

B) program code for periodically re-calculating each trajectory;

C) program code for identifying conflicts between pairs of trajectories or between a trajectory and an obstacle within the airspace; and D) program code for modifying at least one trajectory of the conflicting pair of trajectories or the trajectory in conflict with the obstacle within the airspace;

wherein one of B) and D) are performed in accordance with at least one predetermined rule;

and wherein the data describing the trajectory for each of the aircrafts, comprises a multi-dimensional data structure stored in computer memory and comprising data representing coordinate values within the airspace model, a first time value, and a second time value.

9. The computer program product of claim 8 wherein the at least one predetermined rule is selected from any of routing, altitude, speed, reduced fuel burn, reduced flight time, reduced emissions through shorter segments flown at optimum altitudes, seamless climb to cruise, optimal profile descents, customer-required destination time-of-arrival, minimized time-of-flight.

10. The computer program product of claim 8 wherein the at least one predetermined rule is selected from any of aircraft separation minimum and obstacle separation minimum.

11. A computer program product for use with a computer system, the computer program product comprising a non-transitory computer readable medium having embodied therein program code for managing aircrafts within an airspace, the computer program product comprising:

A) program code for, upon entry of an aircraft into an airspace, receiving from the aircraft and storing in a computer memory, data describing a trajectory representing the aircraft;

B) program code for periodically re-calculating the trajectory representing the aircraft;

C) program code for identifying conflicts between the trajectory representing the aircraft and another trajectory representing one of another aircraft and an obstacle within the airspace; and D) program code for modifying the trajectory representing the aircraft; and E) program code for communicating data representing a modified trajectory to the aircraft wherein the data describing the trajectory representing the aircraft comprises multi-dimensional data comprising a first time value and a second time value.

12. The computer program product of claim 11 wherein the data representing the modified trajectory comprises any of aircraft altitude, speed, power settings, heading, required time of arrival, and aircraft configuration.

* * * * *

UNITED STATES PATENT AND TRADEMARK OFFICE

CERTIFICATE OF CORRECTION

PATENT NO. : 8,965,672 B2
APPLICATION NO. : 14/038920
DATED : February 24, 2015
INVENTOR(S) : Bruce K. Sawhill et al.

It is certified that error appears in the above-identified patent and that said Letters Patent is hereby corrected as shown below:

In the Specification

Column 1, lines 17-19 (Related Applications), the portion of the line reading "U.S. Provisional Patent Application Ser. No. 61/450,453, filed on Mar. 18, 2011, entitled Airspace Phase Transitions And The Traffic Physics Of Interacting 4DTrajectories." should read -- U.S. Provisional Patent Application Ser. No. 61/450,453, filed on Mar. 8, 2011, entitled Airspace Phase Transitions And The Traffic Physics Of Interacting 4DTrajectories. --

Signed and Sealed this
Sixteenth Day of June, 2015

Michelle K. Lee
*Director of the United States Patent and Trademark Office*